(12) United States Patent
Espeut, Jr.

(10) Patent No.: US 8,222,548 B2
(45) Date of Patent: Jul. 17, 2012

(54) AUTOMATIC TRANSFER SWITCH

(75) Inventor: Donald B. Espeut, Jr., Lawrenceville, GA (US)

(73) Assignee: Generac Power Systems, Inc., Waukesha, WI (US)

( * ) Notice: Subject to any disclaimer, the term of this patent is extended or adjusted under 35 U.S.C. 154(b) by 303 days.

(21) Appl. No.: 12/462,142

(22) Filed: Jul. 30, 2009

(65) Prior Publication Data

US 2010/0038966 A1 Feb. 18, 2010

Related U.S. Application Data

(60) Provisional application No. 61/084,899, filed on Jul. 30, 2008.

(51) Int. Cl.
*H01H 9/20* (2006.01)
(52) U.S. Cl. .................................. 200/50.33
(58) Field of Classification Search ............. 200/50.01, 200/50.32, 50.33; 307/64
See application file for complete search history.

(56) References Cited

U.S. PATENT DOCUMENTS

| | | |
|---|---|---|
| 704,336 A | 7/1902 | Ihider |
| 1,014,600 A | 1/1912 | Kleinschmidt |
| 1,439,905 A | 12/1922 | Lull |
| 1,792,311 A | 2/1931 | Krantz |
| 1,957,381 A | 5/1934 | Barry |
| 2,028,259 A | 1/1936 | Van Valkenburg |
| 2,149,865 A | 3/1939 | Packer |
| 2,604,796 A | 7/1952 | Freese |
| 2,612,789 A | 10/1952 | Bierenfeld |
| 2,646,474 A | 7/1953 | Stratton |
| 2,667,554 A | 1/1954 | Shores |
| 2,721,236 A | 10/1955 | Williams |
| 2,756,612 A | 7/1956 | Schleicher |
| 2,841,666 A | 7/1958 | Anderson |
| 2,877,919 A | 3/1959 | Kobryner |
| 3,149,210 A | 9/1964 | Haydu et al. |
| 3,210,491 A | 10/1965 | Di Marco |
| 3,233,052 A | 2/1966 | Contal |
| RE26,133 E | 1/1967 | Carter et al. |
| 3,510,612 A | 5/1970 | Ward |
| 3,534,187 A | 10/1970 | Karch |
| 3,536,868 A | 10/1970 | Lawrence et al. |
| 3,567,886 A | 3/1971 | Ross |
| 3,618,804 A | 11/1971 | Krause |
| 3,647,997 A | 3/1972 | Nerem |
| 3,697,709 A | 10/1972 | Witkor |
| 3,761,652 A | 9/1973 | Burns |
| 3,778,633 A | 12/1973 | DeVisser et al. |
| 4,021,678 A | 5/1977 | Moakler et al. |
| 4,398,097 A * | 8/1983 | Schell et al. .................... 307/64 |
| 4,423,336 A | 12/1983 | Iverson et al. |
| 4,513,181 A | 4/1985 | Boysent et al. |
| 4,661,760 A | 4/1987 | Goto et al. |
| 4,665,284 A | 5/1987 | Guinan |
| 4,699,289 A | 10/1987 | You |

(Continued)

*Primary Examiner* — Vanessa Girardi
(74) *Attorney, Agent, or Firm* — Andrew C. Landsman; Brian G. Gilpin; Godfrey & Kahn, S.C.

(57) ABSTRACT

An automatic transfer switch apparatus for use with a stand-alone generator, for supplying emergency power to a residence or small business. The automatic transfer switch apparatus is configured to sense a utility line failure, start up and stabilize the generator, and switch over the household circuits from the utility to the generator, and switch back when the utility recovers. The transfer switches incorporate motor-driven switch interlock mechanisms in several embodiments, as well as various operational features.

9 Claims, 38 Drawing Sheets

U.S. PATENT DOCUMENTS

| | | |
|---|---|---|
| 4,805,073 A | 2/1989 | Johnson et al. |
| 4,999,598 A | 3/1991 | Jannesari et al. |
| D318,651 S | 7/1991 | Sharp et al. |
| D318,652 S | 7/1991 | Buchanan |
| D318,854 S | 8/1991 | Sharp et al. |
| 5,164,694 A | 11/1992 | DeVault et al. |
| 5,268,850 A | 12/1993 | Skoglund |
| 5,280,231 A | 1/1994 | Kato et al. |
| 5,416,416 A | 5/1995 | Bisher |
| D360,874 S | 8/1995 | Duff et al. |
| D371,113 S | 6/1996 | Hubbell et al. |
| 5,563,802 A | 10/1996 | Plahn et al. |
| 5,583,440 A | 12/1996 | Bisher |
| 5,739,594 A | 4/1998 | Sheppard et al. |
| 5,761,027 A | 6/1998 | Flegel |
| 5,769,006 A | 6/1998 | Allaer |
| D400,183 S | 10/1998 | Flegel |
| 5,838,219 A | 11/1998 | Du et al. |
| 5,900,734 A | 5/1999 | Munson |
| 5,929,379 A | 7/1999 | Reiner et al. |
| 5,977,647 A | 11/1999 | Lenz et al. |
| 6,002,579 A | 12/1999 | Drexler |
| D419,966 S | 2/2000 | Mowery et al. |
| 6,031,193 A | 2/2000 | Flegel |
| 6,054,656 A | 4/2000 | Flierl et al. |
| D425,493 S | 5/2000 | Cutright et al. |
| D429,688 S | 8/2000 | Russo |
| 6,096,986 A | 8/2000 | Flegel |
| 6,100,604 A | 8/2000 | Morroni et al. |
| 6,137,070 A | 10/2000 | Montague et al. |
| 6,172,432 B1 | 1/2001 | Schnackenberg et al. |
| 6,179,144 B1 | 1/2001 | Abroy et al. |
| 6,225,581 B1 | 5/2001 | Gerbert-Gaillard et al. |
| 6,320,143 B1 * | 11/2001 | Greer .................... 200/50.33 |
| 6,541,719 B1 | 4/2003 | Powell |
| 6,545,374 B1 | 4/2003 | Allenbach |
| 6,583,521 B1 | 6/2003 | Lagod et al. |
| 6,593,670 B2 | 7/2003 | Anderson |
| 6,731,484 B2 | 5/2004 | Pebles et al. |
| 6,815,623 B1 * | 11/2004 | Holland .................... 200/50.32 |
| 6,850,037 B2 | 2/2005 | Bertness |
| 6,850,038 B2 | 2/2005 | Arai et al. |
| 6,861,596 B2 | 3/2005 | Schnackenberg |
| 6,876,103 B2 | 4/2005 | Radusewicz et al. |
| 6,879,483 B2 | 4/2005 | Jonson et al. |
| 6,927,349 B1 | 8/2005 | Flegel et al. |
| 6,965,818 B2 | 11/2005 | Koenig et al. |
| 6,989,502 B1 | 1/2006 | Lu |
| D517,507 S | 3/2006 | Johnson et al. |
| 7,026,558 B1 | 4/2006 | Andreyo |
| 7,089,127 B2 | 8/2006 | Thibedeau et al. |
| 7,126,068 B2 | 10/2006 | Fillppenko |
| 7,146,256 B2 | 12/2006 | Hibi et al. |
| 7,208,914 B2 | 4/2007 | Klang |
| 7,211,750 B2 | 5/2007 | Fillppenko et al. |
| 7,218,118 B1 | 5/2007 | Gonring |
| 7,230,345 B2 | 6/2007 | Winnie et al. |
| D563,324 S | 3/2008 | Schnackenberg |
| D566,062 S | 4/2008 | Schnackenberg |
| 7,402,766 B1 | 7/2008 | Jonas et al. |
| 7,423,215 B2 | 9/2008 | Cardenas et al. |
| 7,435,920 B1 | 10/2008 | Yoo |
| 7,446,271 B2 * | 11/2008 | McCoy .................... 200/50.33 |
| 7,462,791 B1 * | 12/2008 | Flegel .................... 200/50.32 |
| 7,599,171 B1 | 10/2009 | Remmert |
| 2003/0075982 A1 | 4/2003 | Seefeldt |
| 2004/0195997 A1 | 10/2004 | Borrego Bel et al. |
| 2005/0183868 A1 | 8/2005 | Taylor et al. |
| 2006/0072262 A1 | 4/2006 | Paik et al. |
| 2006/0091848 A1 | 5/2006 | Braun et al. |
| 2006/0131146 A1 * | 6/2006 | Filippenko ............... 200/50.33 |

\* cited by examiner

|  | BOX0, | BOX1 |
|---|---|---|
| 100/100 | 1 | 1 |
| 200/125 | 0 | 1 |
| 200/200 | 1 | 0 |
| ERROR | 0 | 0 |

|  | AEX0, | AEX1 |
|---|---|---|
| OFF | 1 | 1 |
| 7 DAY | 0 | 1 |
| 14 DAY | 1 | 0 |
| 28 DAY | 0 | 0 |

AUTOMATIC TRANSFER SWITCH

This application claims priority to U.S. Provisional Patent Application No. 61/084,899 and U.S. Design patent application Ser. No. 29/322,214, both of which were filed on Jul. 30, 2008, the contents of both of which are expressly incorporated by reference herein.

BACKGROUND OF THE DISCLOSURE

1. Field of the Invention

The present invention relates to the technical field of transfer switches, for use with portable or stationary electric generators. In particular, the present invention is directed to an automatic transfer switch apparatus.

2. Background

Transfer switches, for use in association with portable or stand-alone electrical generators, are known in the prior art.

A private residence, for example, may normally receive its electrical power from a utility company. For various reasons, however (location in a region prone to severe weather, etc.), the homeowner may desire a back-up source of electrical power, so that comfort or at least habitability of the residence can be maintained, during periods in which utility power is unavailable.

Typically, a gasoline, diesel, propane or natural gas internal combustion engine-powered electrical generator, capable of generating split-phase alternating voltage, may be installed in or near the residence, and arranged to be connected to one or more of the electrical circuits in the residence in order to provide the desired back-up power.

However, one cannot simply leave the back-up generator permanently connected, in parallel with the utility power, to the residential electrical circuits, nor can one simply connect and power up a back-up generator, without first disconnecting the residential circuits from the power lines coming in from the utility. The reason for this is the possibility that some of the current generated by the back-up generator may inadvertently be backfed into the utility power lines, which may lead to personal injury and/or damage to utility equipment (transformers, etc.).

Transfer switches have been provided to establish the electrical connections between the utility, the residential circuit(s) and the back-up generator. Prior art residential transfer switches typically have been manually actuated devices; known as "break, then make" switches. This means that when the switch is thrown, the connection between the residential circuit(s) and whichever current source is at the time actually connected to the residential circuit, is broken, before the connection is made between the residential circuit, and the current source which is being substituted in.

In a typical situation, utility power fails or falls drastically. The residence owner proceeds to start up the back-up generator, and once operating speed and voltage have been attained, the switch is manually thrown, to disconnect the utility from the residential circuit, and thereafter, cut in the current from the back-up generator.

Prior art manual transfer switches are capable of providing the simple function of serving to safely accomplish the substitution of power sources. However, such prior art manual switches require the presence of the homeowner, in order to accomplish the transfer. This may be undesirable, in that some appliances (e.g., refrigerator or freezer, sump pump, etc.) should not go without power for extended periods of time. If a homeowner is absent for more than an hour or two, continued power outages may cause potentially serious damage or injury to equipment, property, pets, etc.

Accordingly, it would be desirable to provide a transfer switch for residential/small business environments and the like, that is capable of actuating automatically, upon sensing a sustained interruption of utility-supplied electrical power.

It would also be desirable to provide an automatic transfer switch, that is capable of starting a back-up generator, upon sensing a sustained interruption of utility-supplied electrical power, and disconnecting the utility and connecting the back-up, when the back-up generator is capable of assuming the load.

These and other desirable characteristics of the invention will become apparent in light of the present specification, claims and drawings.

SUMMARY OF THE INVENTION

The invention is directed to automatic transfer switches for switching the supply of electrical power to a load, between utility and auxiliary electrical power sources. Several mechanical circuit breaker switch interlock mechanisms are provided, which are propelled by motor assemblies that are controlled by programmable controllers that monitor one or more characteristics of the utility electrical power source, for initiating a switch to auxiliary electrical power, when it appears that the utility electrical power may fail. The interlock mechanisms are break before make mechanisms, and each includes a motor driving actuator, and an interlock member passively mounted in cooperation with the handles of the circuit breaker switches, to ensure that the respective circuit breaker switches cannot be both in their respective "ON" positions simultaneously.

The invention also comprises an automatic transfer switch construction, in which the circuit breakers, and controller are all mounted together on the common power buss for the automatic transfer switch. In embodiments of the invention, in which the automatic transfer switch is switchably connected to a plurality of distinct and electrically isolated circuits, the controller is advantageously configured to have a learning function upon installation, so as to detect and record in memory the values for the loads imposed by each of the plurality of circuits, for facilitating load management. The controller also has a dynamic load shedding function, which enables the controller to shed discretionary loads if the total load being powered exceeds a predetermined percentage of the auxiliary power capacity, but enables it to go to the discretionary load, that is next in priority which has a load that, when summed with any mandatory loads (and higher priority discretionary loads) does not exceed the predetermined percentage of auxiliary power capacity.

BRIEF DESCRIPTION OF THE DRAWINGS

FIG. 2A-8 are schematic illustrations of an interlock mechanism (omitting the motor) for an automatic transfer switch according to the embodiment of FIG. 2, showing a transfer procedure.

FIG. 20A is an exploded perspective view of the interlock mechanism according to the embodiment of FIG. 20.

Figure 20:
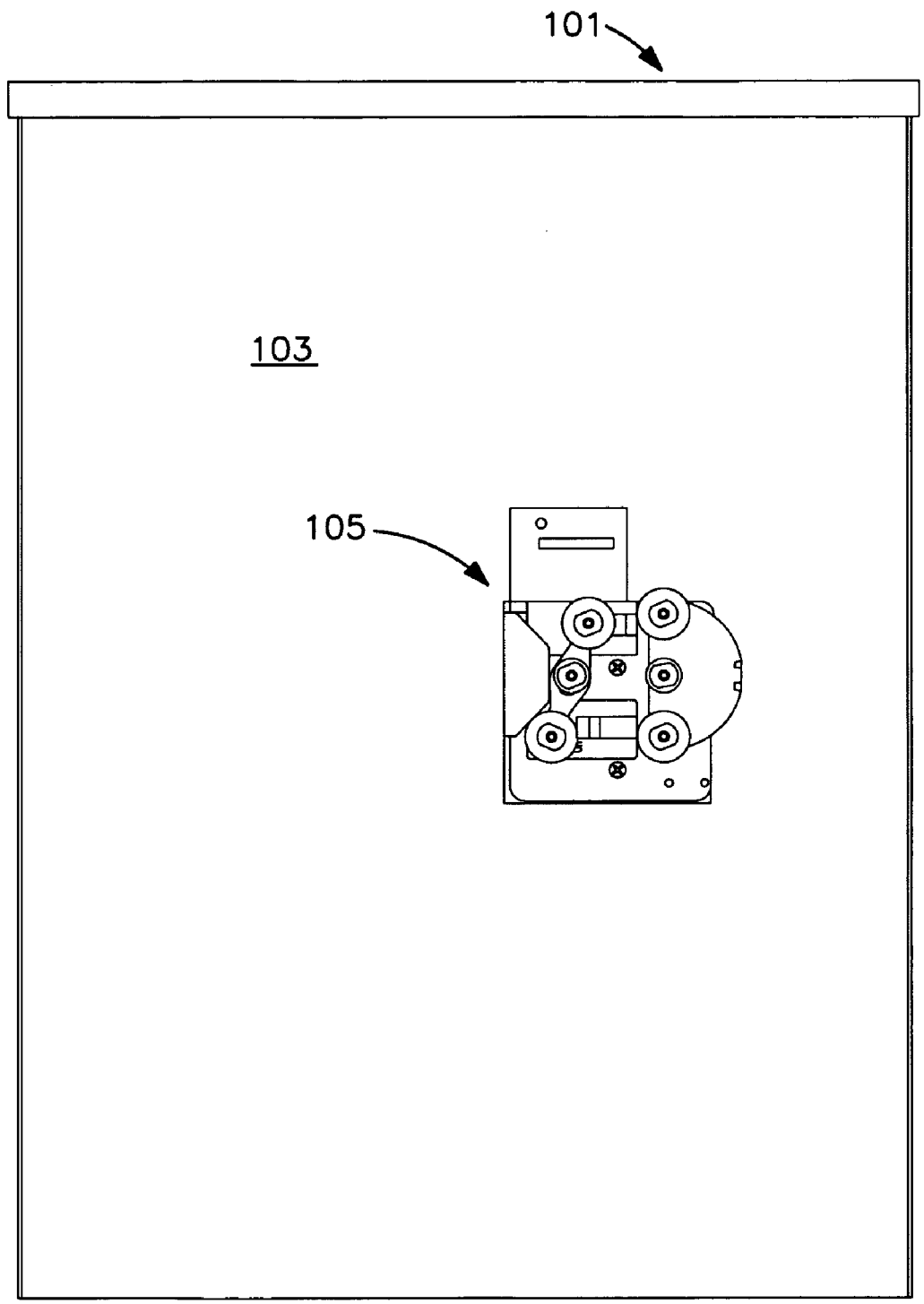
FIG. 20 is a front view of an automatic transfer switch according to another embodiment of the invention, with the cover removed to show the dead front panel, and the interlock mechanism.

*Fig.* 21A is an exploded perspective view of the interlock mechanism according to the embodiment of FIG. 20.

Figure 21:
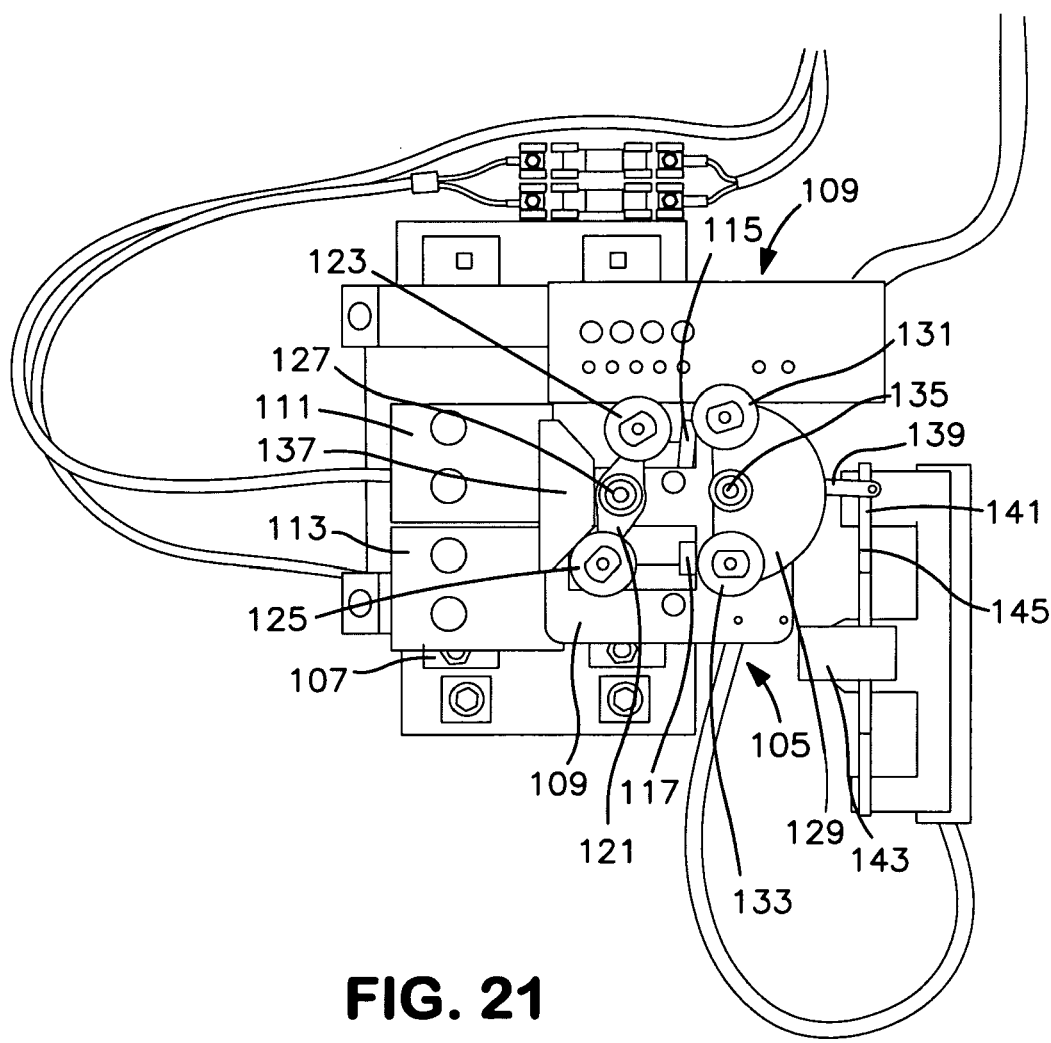
FIG. 21 is an enlarged view of the automatic transfer switch of FIG. 20, with the dead front panel removed to disclose the breakers and motor drive for the interlock mechanism.
Figure 21A:
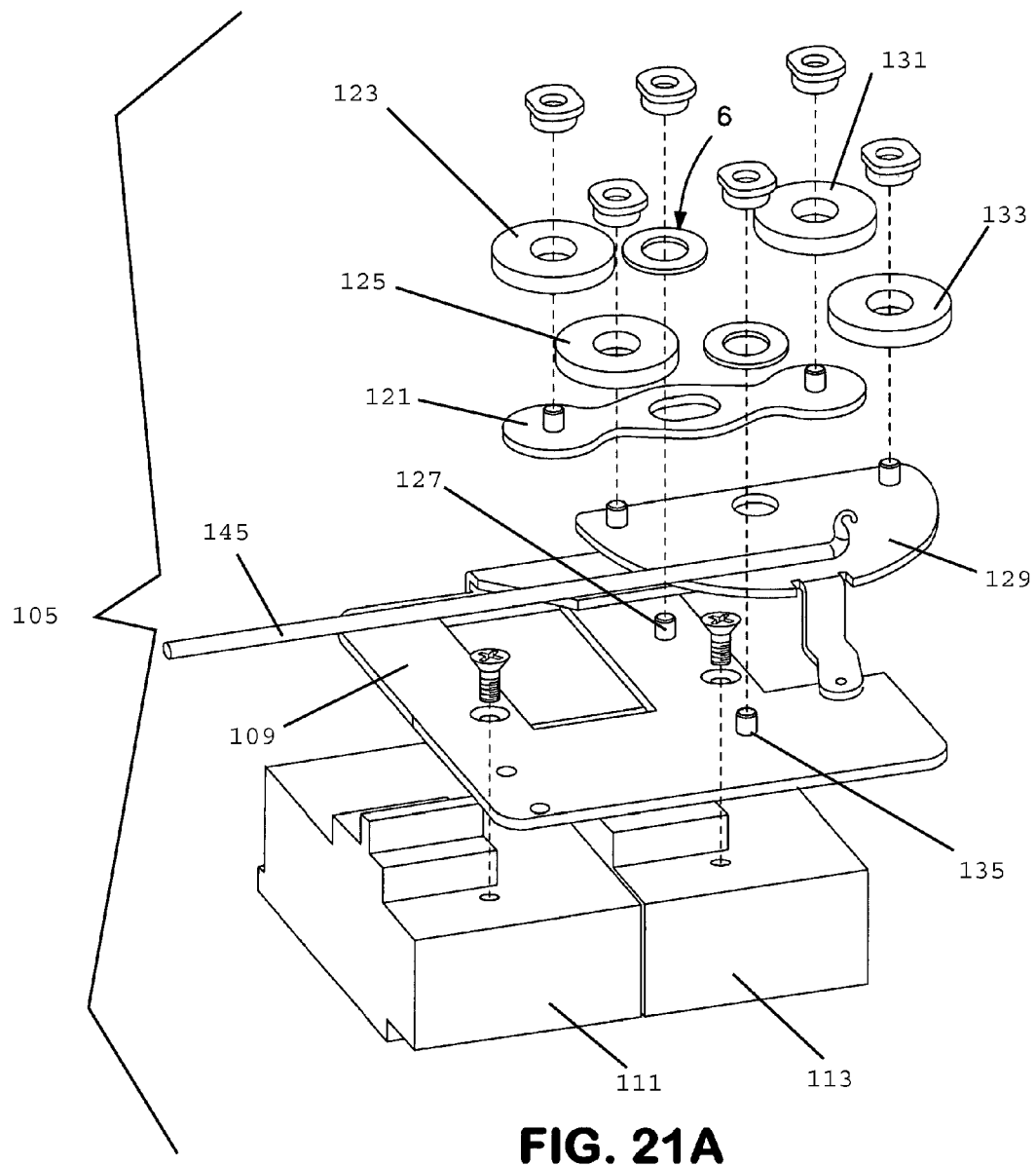

FIGS. 22-27 are schematic illustrations of an interlock mechanism (omitting the motor) for an automatic transfer switch according to the embodiment of FIGS. 20-21, showing a transfer procedure.

Figure 25:
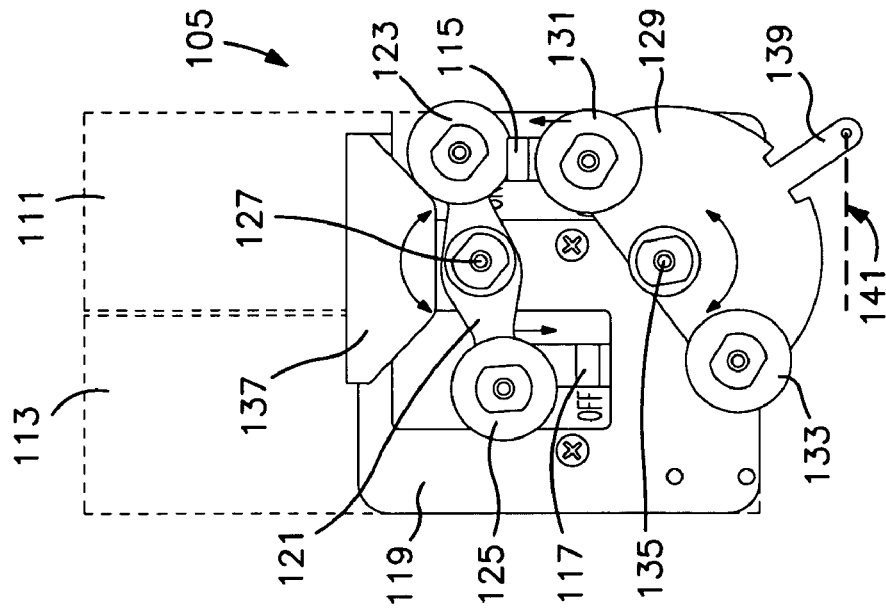
Figure 27:
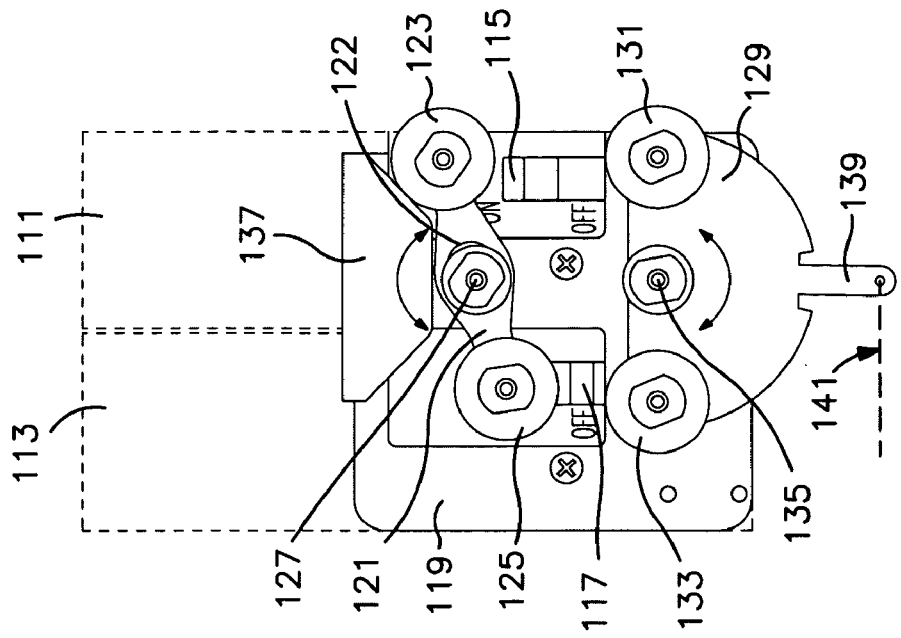
Figure 26:
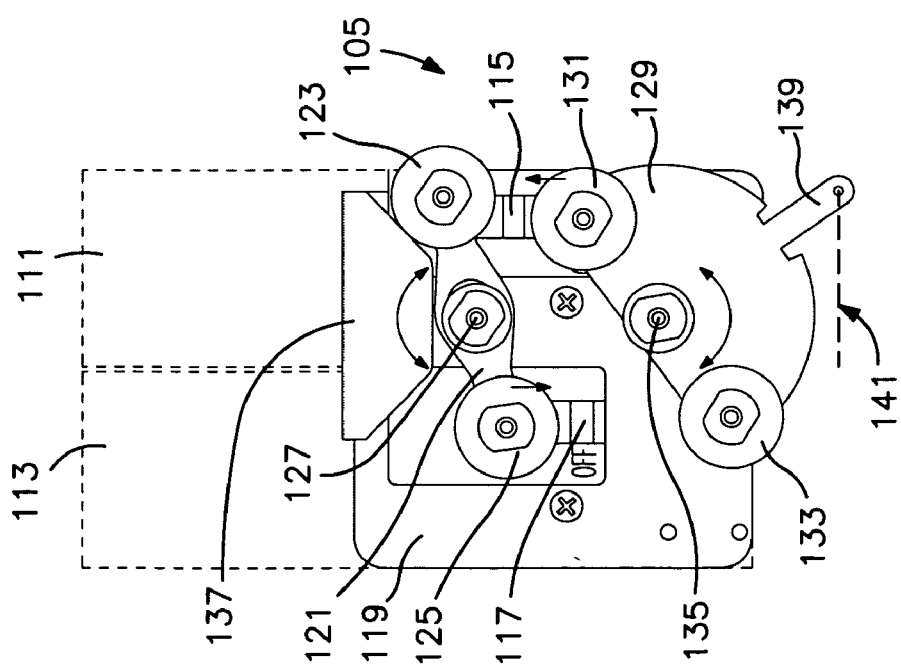
Figure 27A:
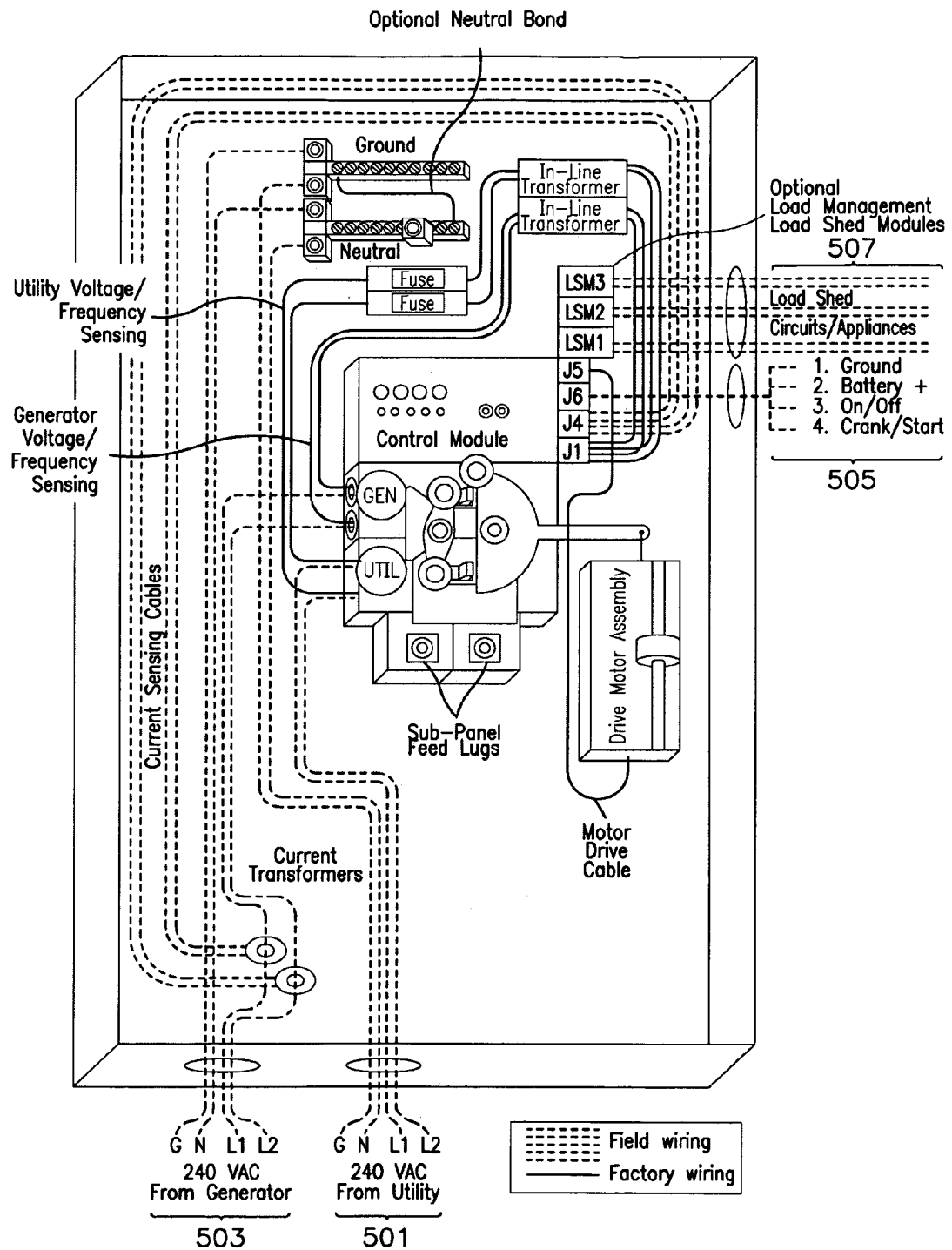

FIG. 27A is a representative wiring schematic for an automatic transfer switch according to the embodiment of FIGS. 20-27.

Figure 28:
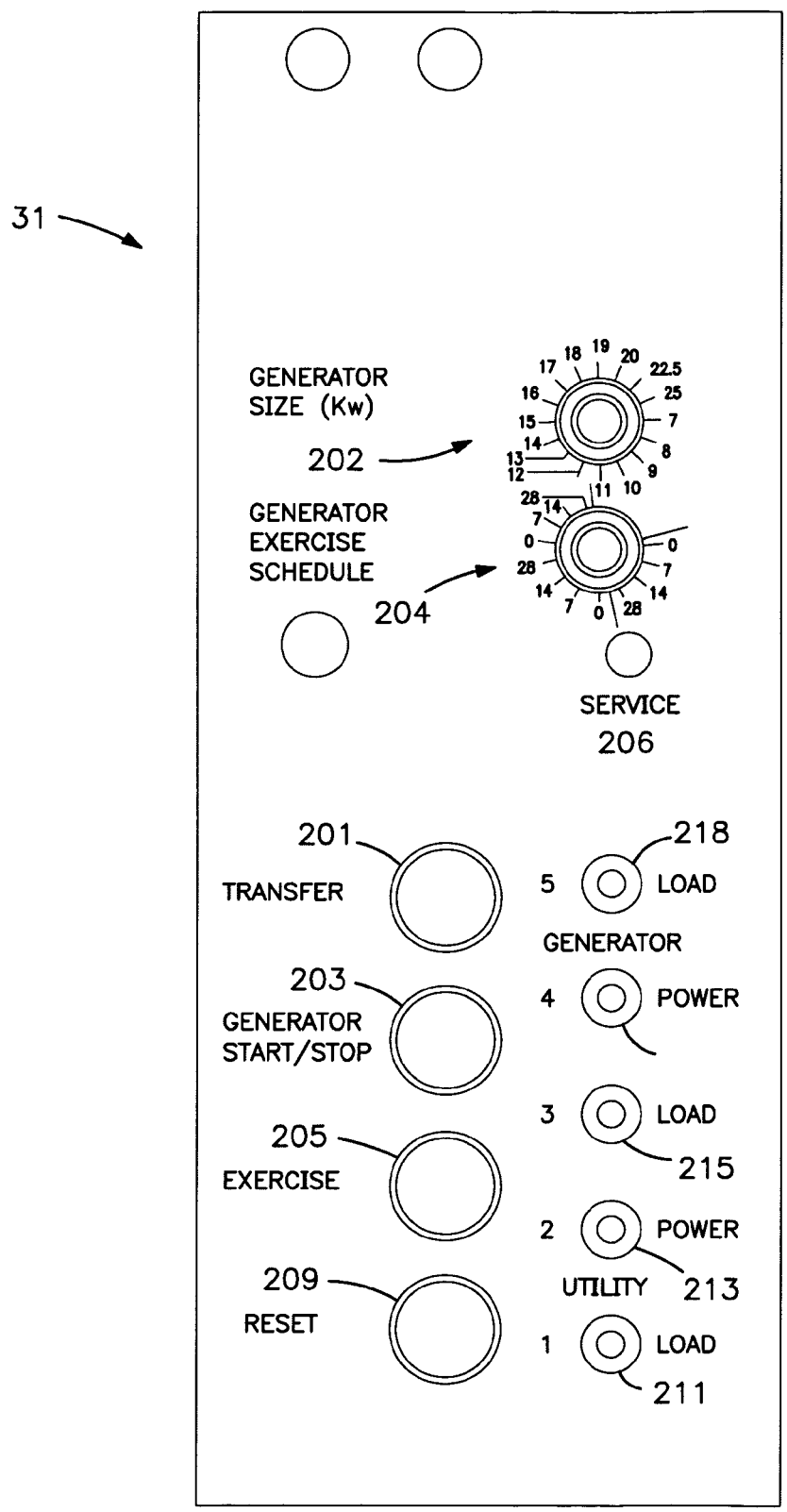

FIG. 28 is a schematic illustration of a representative control panel for an automatic transfer switch according to the present invention, showing the function buttons used during the self-learning mode used during installation or reprogramming of the automatic transfer switch.

Figure 29:
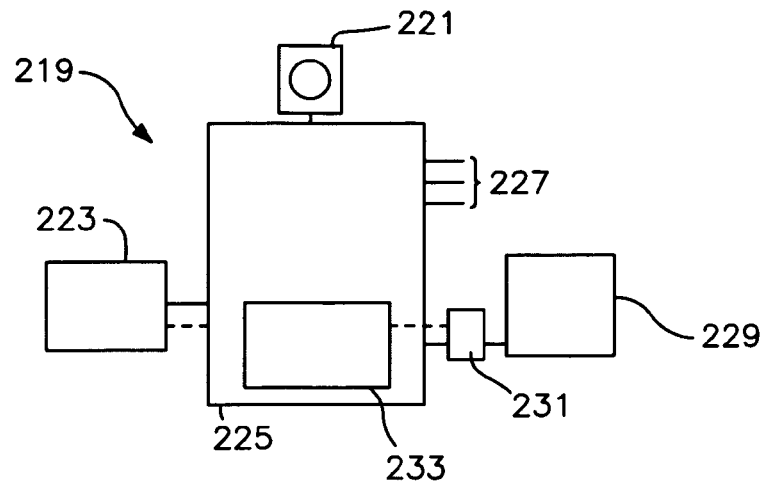

FIG. 29 is a schematic illustration of an electrical system of a structure in which an ATS according to the present invention is used as the sole load center for the system.

Figure 30:
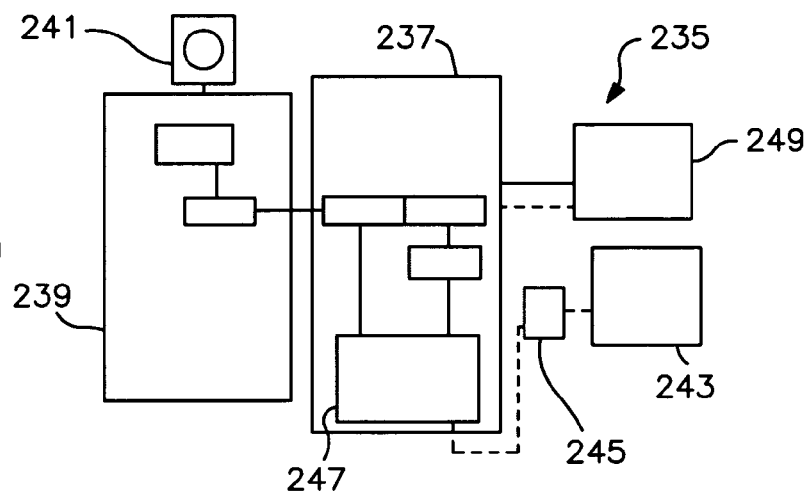

FIG. 30 is a schematic illustration of an electrical system in which an ATS according to the present invention is used as a supplement to an existing load center.

Figure 31:
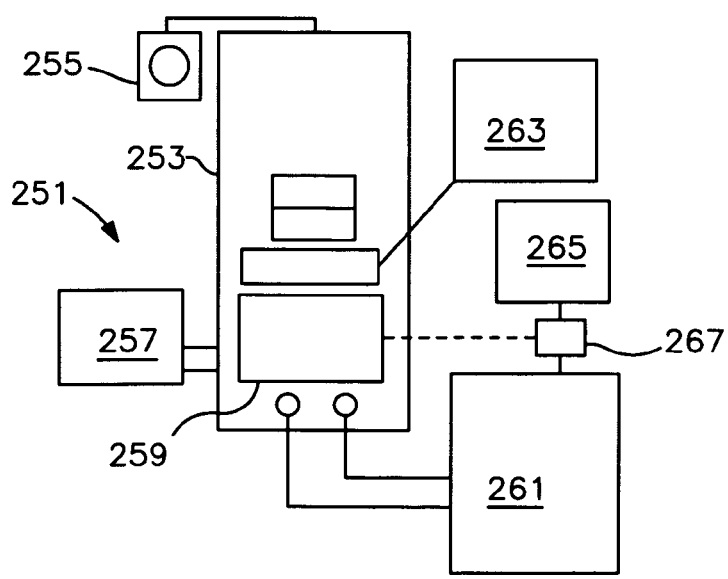

FIG. 31 is a schematic illustration of an electrical system in which an ATS according to the present invention, is installed between an existing load center and power sources, to act as a service disconnect, and to act as a subpanel to supply, e.g., new loads installed subsequent to loads serviced by the original load center.

FIGS. 32-39 illustrate the schematics for representative circuits comprising the control module for an ATS according to an embodiment of the present invention.

Figure 40:
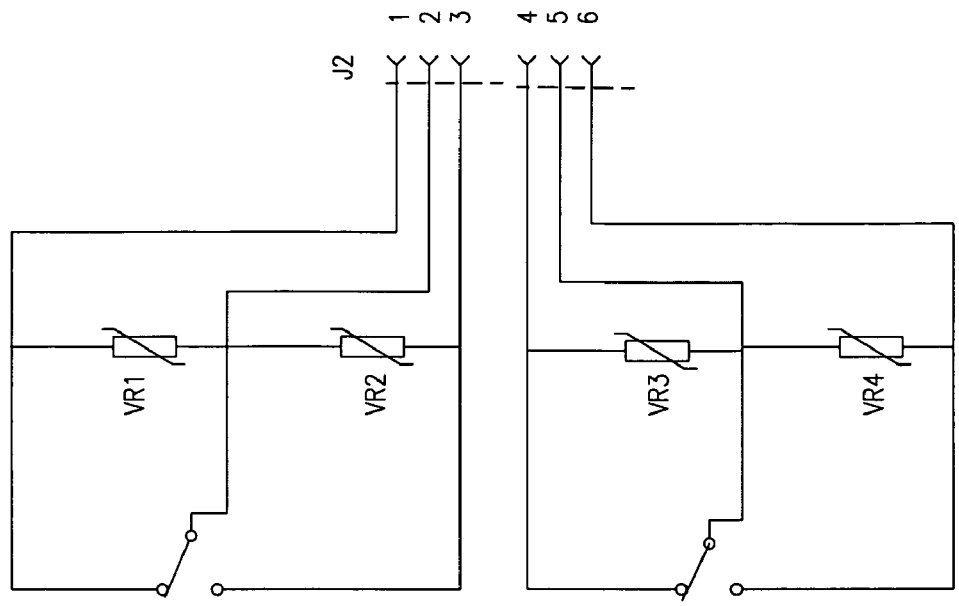
Figure 40:
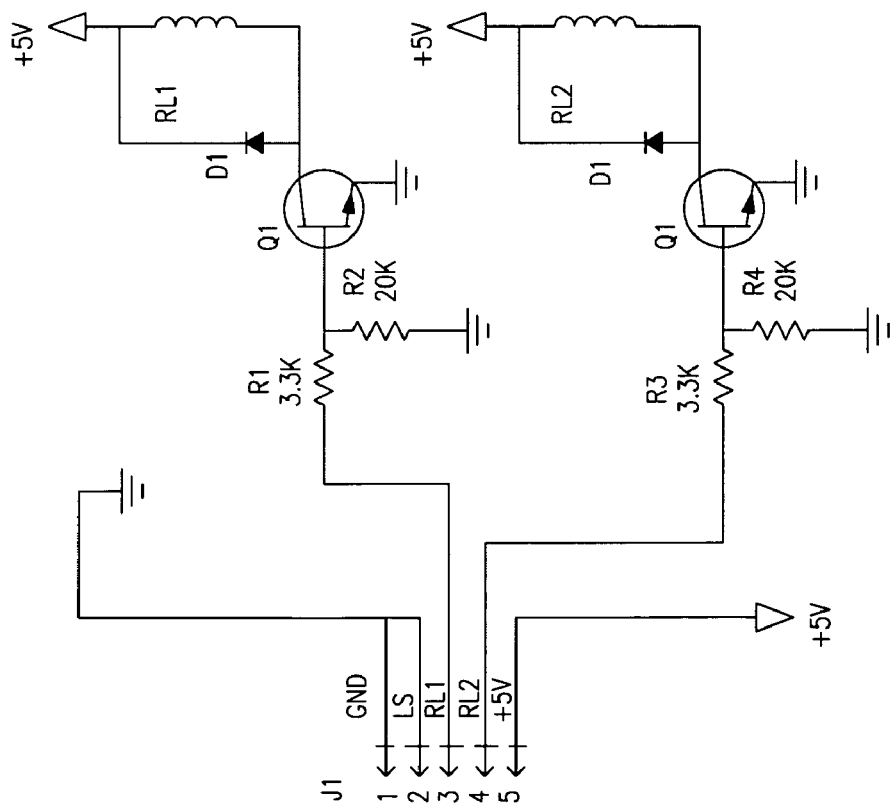

FIG. 40 is a schematic of a representative circuit for a load shed model according to a preferred embodiment of the invention.

Figure 41A:
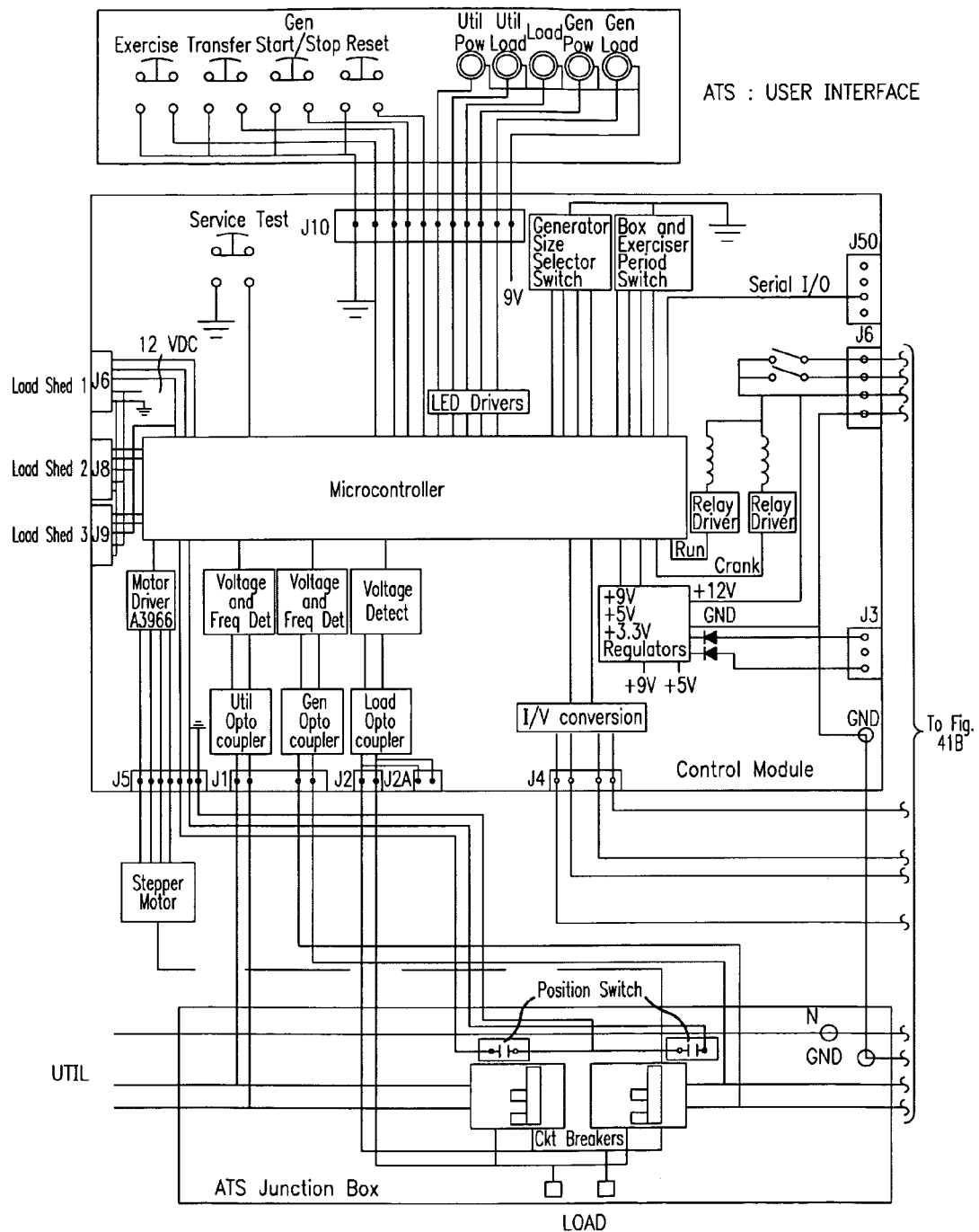
Figure 41B:
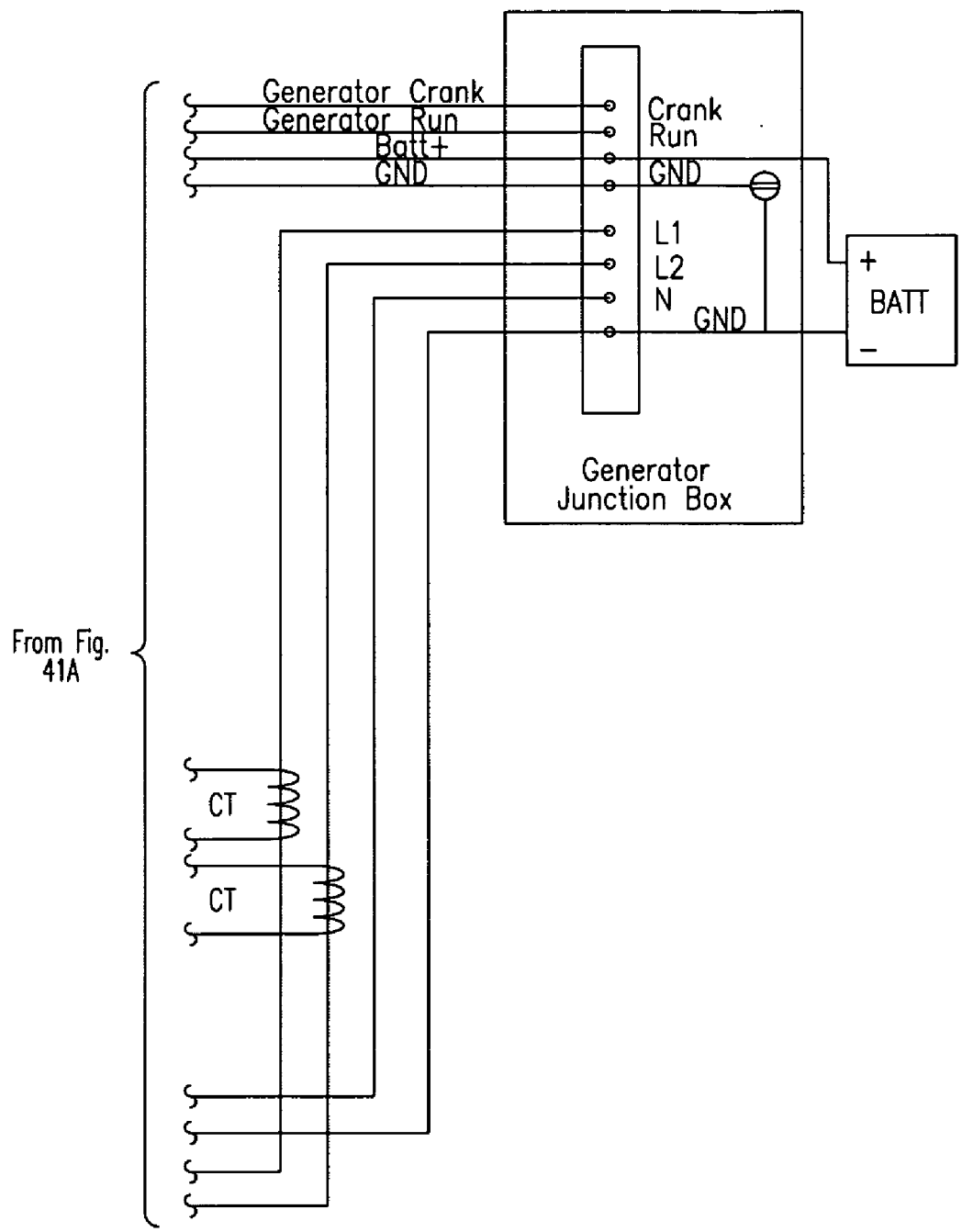

FIGS. 41A, 41B illustrate a block diagram for the control module and user interface for an Automatic Transfer Switch according to an embodiment of the present invention, showing the connections to utility power and to an auxiliary electrical generator.

Figure 42:
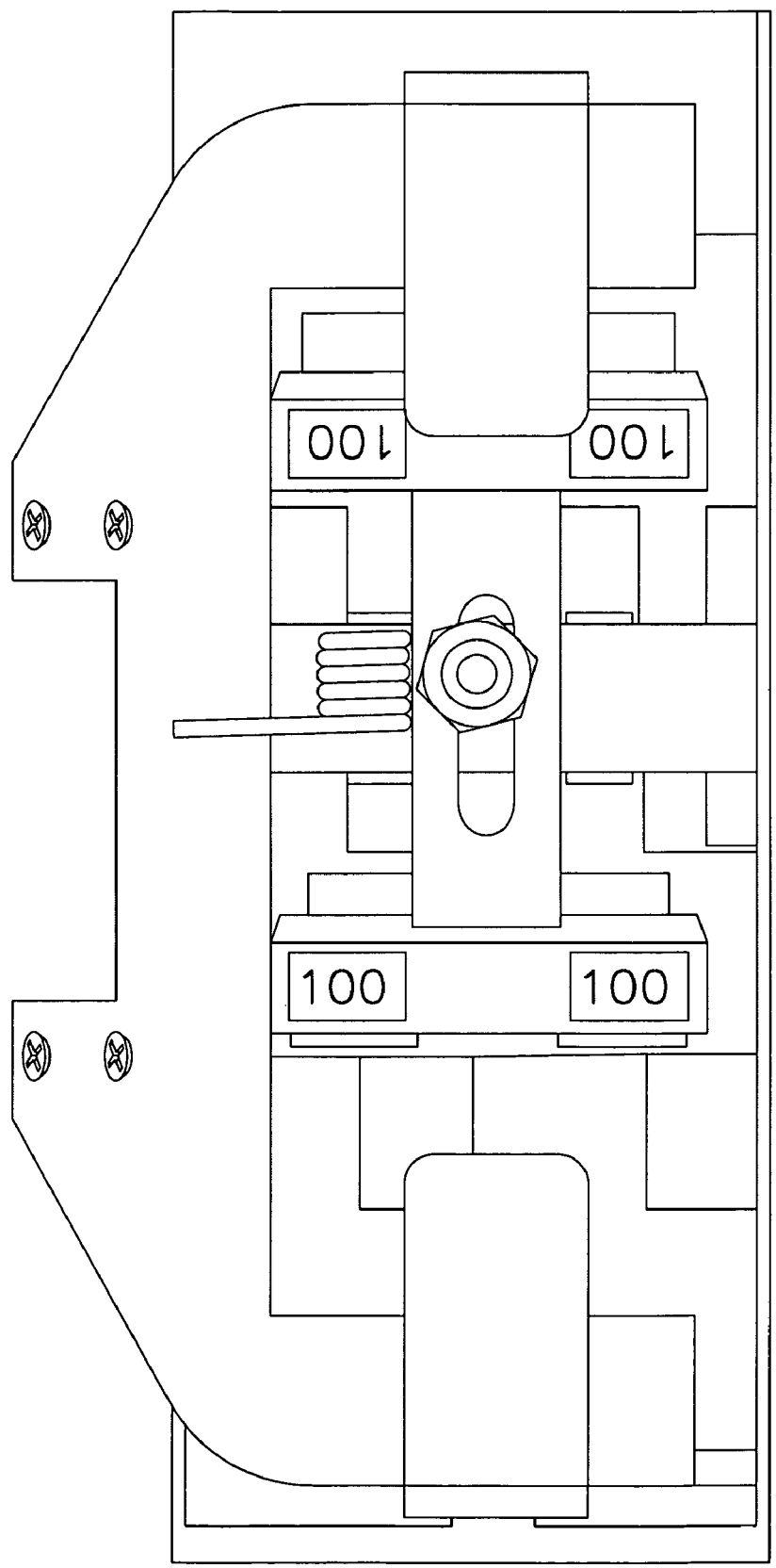

FIG. 42 illustrates an alternative embodiment of the interlock mechanism shown in FIGS. 2-8.

DETAILED DESCRIPTION OF THE INVENTION

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extend that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an, embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

The present invention is directed to automatic transfer switches, which incorporate motorized interlock constructions for actuating circuit breakers in various configurations.

In the present disclosure, reference may be made to "household" circuitry. This is to be understood to mean the location, the electrical needs for which are supplied normally by utility power, and which may be supplied, at least in part, during emergency situations, by auxiliary power. Accordingly, "household" may be understood to have an expanded meaning to encompass any residence, business or governmental facility or other structure (e.g., a church, etc.) having a use for auxiliary power.

Figure 1:
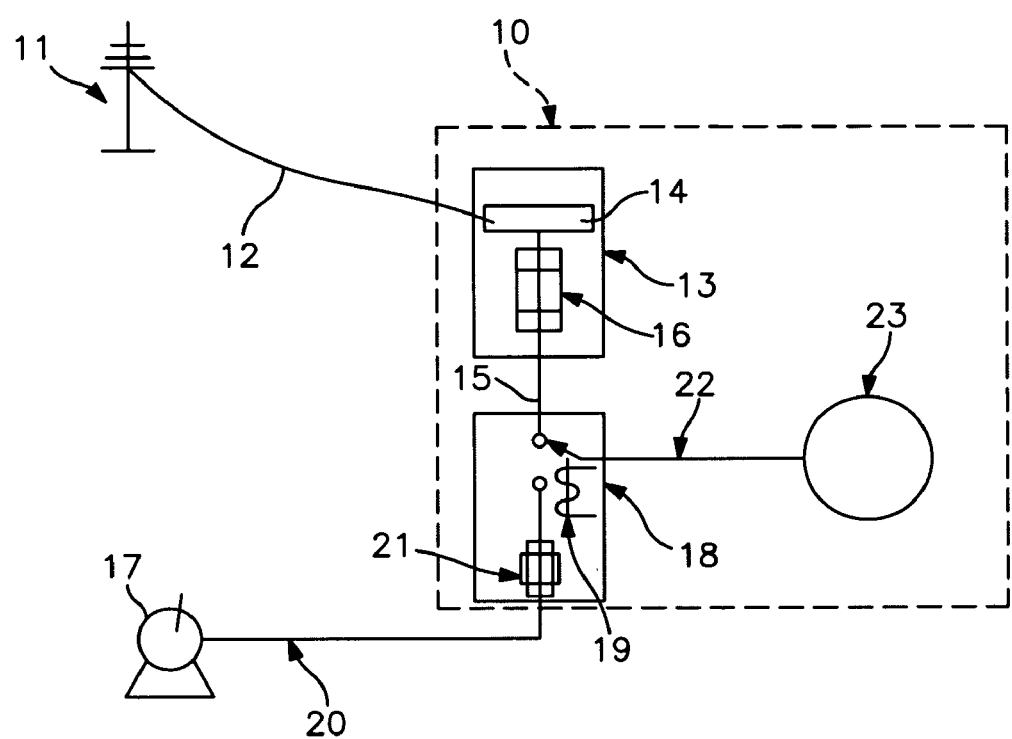
FIG. 1 is a basic schematic of a power supply system for a residence that is provided with a back-up generator (or other auxiliary power source), as well as utility power.

FIG. 1 is a schematic "single-line" diagram, demonstrating the general environment of the automatic transfer switch, of the present invention. While only single lines are shown in FIG. 1a, it is understood that each line actually represents phase A and phase B wires. Likewise, it is understood that a typical residence will have numerous outputs from the bus bar in the breaker box.

In the absence of a generator (or other auxiliary power source) and transfer switch, a typical residence 10 receives utility power 11, in the form of line 12, that connects to a residential electrical distribution box, typically a breaker box, in which the incoming line A, B and neutral lines connect to separate bus bars, and then several lines, representing the several household circuits, emanate from the bus bar. Typically, each output from the A and B bus bars has a circuit breaker in it.

In the simplified set-up of FIG. 1, the utility lines A, B and neutral enter the breaker box 13 of the residence, and connect to bus bars 14. From bus bars 14, one or more outputs 15 pass through respective circuit breakers 16, and onto the various household circuits. In a household that is provided with a back-up generator (or other auxiliary power source) 17, as shown in FIG. 1a, output(s) 15 are instead routed to transfer switch 18, that contains one or more relays 19, switchable between the output(s) 15 and the output(s) 20 (through circuit breaker(s) 21). Output(s) 22 then lead to the load(s) 23 for the residence.

While in FIG. 1, the service power entry/disconnect and load centers are separately housed. In more sophisticated systems, whether incorporating an auxiliary power source or not, the service entry disconnect and load centers may be integrated into a single housing.

In particular, the automatic transfer switches of the present invention may be used in one of three modes: 1) as the sole load center for the electrical circuitry of a structure (FIG. 29); 2) as part of a retrofit, to augment the function of an existing load center in a structure (FIG. 30); or 3) as an "alternative" means for regulating the supply of electricity to a structure or group of structures (FIG. 31).

FIG. 29 illustrates an electrical system 219, in which an ATS 225 of the present invention is being used as the sole load center through which electrical power is controlled and distributed in a residence or other structure. ATS 225 will typically be configured to serve 24-28 electrical subcircuits. Power will be normally supplied from utility 221, or in the case of an emergency (or when so chosen by the operator, such as during a test or "learning" mode, which will be described in greater detail elsewhere herein) by auxiliary power source (e.g., generator) 223. Representative circuits 227 that are set up to be supplied with emergency power may include the household refrigerator, furnace blower, televisions or computers, etc. Other, heavier, loads 229 in the house, such as air conditioning, electric water heater or well pump, may require inline relays 231.

ATS 225 of the present invention will be provided with a programmable control module 233, the functions of which will be described in greater detail elsewhere herein. In a basic installation situation, ATS will be configured to supply any circuit demanding power, during normal times of utility supplied power. However, because it is usually cost-prohibitive to specify an auxiliary power source that has the capacity to fully supply every possible circuit in a system simultaneously, a resident typically will have to select a specific group of loads which will be eligible to receive power during emergency operation, so that the total capacity represented by the emergency loads, does not exceed the capacity of the auxiliary power source. In the absence of the "load shedding" feature described hereinafter, ATS 225 will be configured only to supply auxiliary power to those circuits in the system, part of a fixed group of circuits, which have been previously selected as "base" or "mandatory" circuits.

The auxiliary transfer switches of the present invention can be optionally provided with the ability to selectively connect or disconnect various circuits within the system, in accordance with pre-established priorities determined by the residence owner at the time of installation. There will always be a certain group of loads, which may be considered to be mandatory or base loads, which will be supplied current from the auxiliary or emergency power source, under all circumstances. Presumably, a consumer will have the budget to enable them to obtain an auxiliary or emergency power source which has an available power output which will be capable of meeting or exceeding the total instantaneous demand presented, should all of the loads which are designated as mandatory or base loads present their maximum load demands all at the same time. Exactly what those mandatory or base loads are to be, is a matter of personal choice for the consumer, but examples of loads which may be mandatory or base loads could be include: medical support devices; basic lighting in crucial areas of a residence; freezer or refrigerator; water pump; septic system; sump pump; heating (in cold climates) or air conditioning (in hot climates).

On the other hand, there may be some loads which may be deemed optional (nice to have access to during emergency operations, but not critical), and thus suitable for "load shedding" operations. These loads may include: AC (in colder climates), heat (in warmer climates); water heater; garage door; security devices. Amongst these "load shed" loads, it is possible for the consumer to designate which of these load shed loads are more important or more desirable, and to cause the automatic transfer switch to be able to manage these load shed loads so that those designated as having higher priority are supplied power (if available) over lower priority loads.

This procedure, which is known as "load shedding" enables a generator or other auxiliary power source, having a certain maximum rated power output, to be mated with a group of circuits (both base loads and optional "load shed" loads), the total aggregate maximum load of which may actually exceed the maximum output rating of the auxiliary power source. However, it is highly unlikely that all the loads of a system will be "on" and at full demand, at the same time and during a utility power outage (in part, of course, because a consumer can make the conscious decision to turn off various loads during power outages, and thus dictate, to some extent, what the potential maximum load can be).

Accordingly, it is possible, in accordance with the principles of the present invention, as long as an auxiliary power source is provided that has the capacity to meet the needs of any and all "base" or "mandatory" loads that may require power (AC, water pump, refrigerator), the number of discretionary loads that may be supplied during emergency operations can be greatly increased through the use of load shedding. All automatic transfer switches of the present invention, will be supplied with control modules, as described herein; to enable load shedding capability, one or more programmable load management modules must be added (typically, "plugged in") to the main control module.

FIG. 30 illustrates another environment in which automatic transfer switches in accordance to the present invention may be employed. System 235 is an electrical system in an existing structure, in which ATS 237 is used to supplement an existing original load center 239. Utility power 241 will continue to be routed first through original load center 239, and load center 239 will continue to directly supply those circuits in system 235 that are not intended to receive emergency power under any circumstances. The remaining utility power is then directed to ATS 237 to be distributed to the various subcircuits (not shown) that are intended to receive power during emergency operations, and ATS 237 acts as the load center for those loads. As with system 219, ATS 237 will be supplied auxiliary power by auxiliary power source 249. Also as with system 219, some subcircuits 243, such as AC, well pump, water heater, etc., will require in-line relays 245. Control module 247 may be supplied with load management modules or not, according to the desires of the owner.

FIG. 31 illustrates an alternative arrangement, in which in system 251, in which ATS 253 serves as the service disconnect for an entire system, which may include more than one structure. ATS 253 is able to isolate the circuits from both utility power 255 and auxiliary power source 257, which, in this set up, may be a larger than usual auxiliary power source. In system 251, ATS 253 is installed between existing load center 261, and the utility and auxiliary power sources, and serves as an extension of the existing power center. As in the other set ups, some of the loads 265 regulated by load center 261, such as AC and the like, may require inline relays. In this configuration, upon installation of ATS 253, in-line relays 267 would be connected to control module 259. Loads to be designated as "load shed" loads may be situated in load center 261, and connected to load shed modules (not shown) installed in control module 259 of ATS 253. In addition, ATS 253 serves as a subpanel for loads 263, such as a barn, dock or other outbuilding, which may have been added to the overall electrical system, subsequent to the loads served by the original load center 261. One or more of the loads 263 may likewise be selected as "load shed" loads, and connected to load shed modules installed in ATS 253.

Each ATS according to each embodiment of the present invention preferably will have several functional features in common. For example, through the operation of the control module, each ATS will continuously monitor the state of the utility power being supplied. As soon as the monitored utility power enters a state of sustained power loss (for purposes of the present disclosure, "sustained power loss" may be defined as a voltage drop below 190 V or 54 Hz or voltage in excess of 280 V or 66 Hz; these values are meant to be examples, and other ranges may be selected as desired) for five consecutive seconds, the control module sends start and run signals to the auxiliary generator (or if another type of auxiliary power source is being used, sends a suitable signal to ready that power source to be capable of delivering power). Once the auxiliary generator is up to speed, the start signal is curtailed, and the run signal is maintained.

The ATS then monitors the auxiliary power source (while simultaneously monitoring the utility power status), and once auxiliary power is available, transfers the load (in a break-before-make mode) to the auxiliary power source. When, during auxiliary power operations, utility power has been restored to a reliable state (greater than 204 V or 57 Hz or less than 270 V or 63 Hz, sustained), the ATS is programmed to stand by a further period of time (e.g., sixty seconds), before transferring the load (again, in a break before make manner) back to the utility. Once the hand-off has occurred, the ATS is programmed to allow the generator to continue running, off-load, to allow the generator to cool down for a predetermined period of time, e.g., five (5) minutes, and then terminates the run signal to the generator.

In addition to actual emergency power supply, an ATS according to the present invention is also programmed to spontaneously start up ("exercise") the auxiliary power supply as a test. For example, the ATS may be programmed to start the generator at periods of, e.g., 0 (no scheduled exercise), 7, 14 or 28 days, at a time of day pre-selected to cause minimum disturbance to occupants and neighbors. The ATS also may monitor the state of the generator battery, as well as the status of the battery (rechargeable or otherwise) supplying power to the control module of the ATS itself, and provide a visual indication (via warning LED) if replacement/maintenance is required. The ATS may also be configured to provide for a manual override (for a "commanded" transfer from utility to generator power, using the appropriate input buttons 203, 201, on user interface/control module 31.

Figure 2:
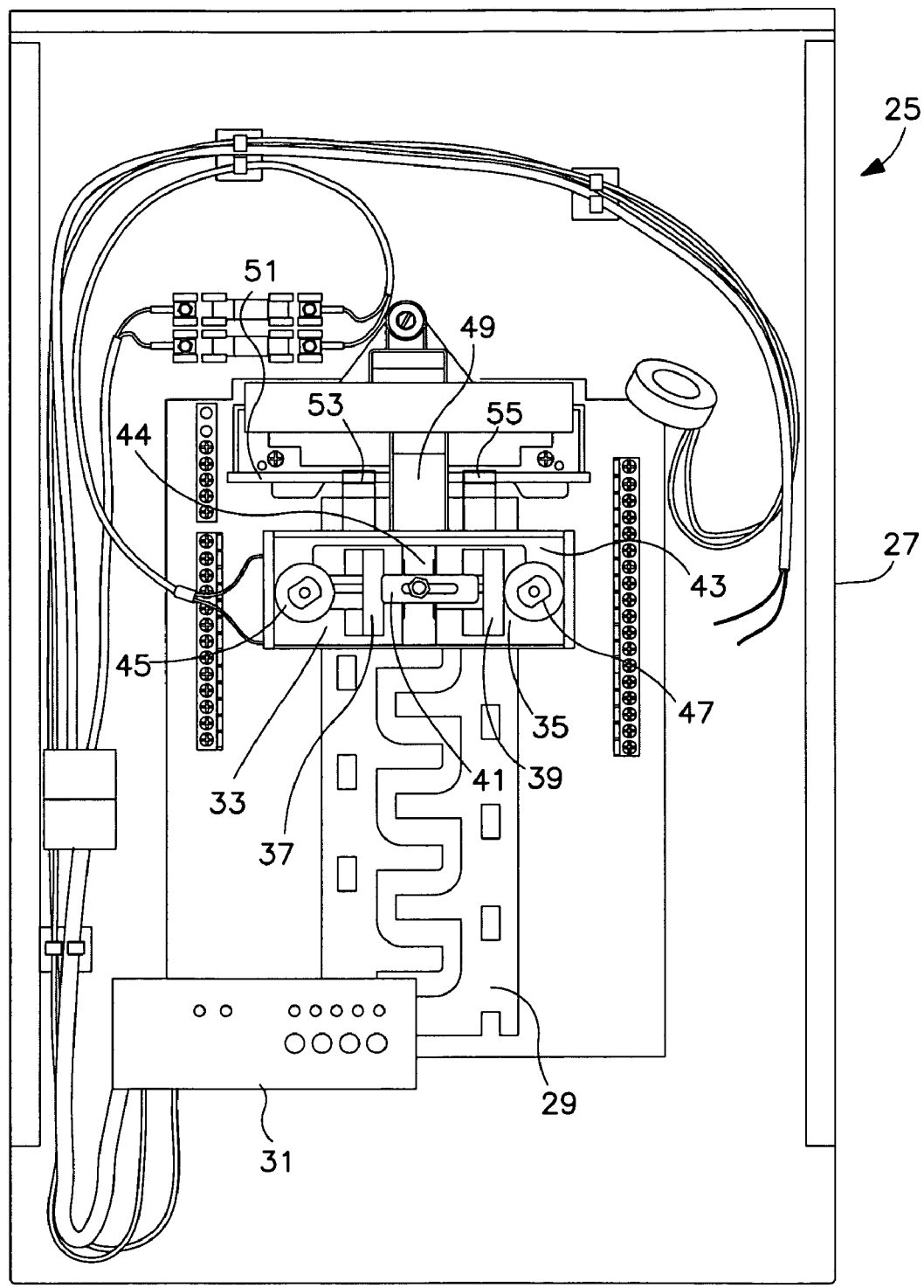
FIG. 2 is a schematic view of an automatic transfer switch according to an embodiment of the invention.

FIGS. 2-10 illustrate the components of an automatic transfer switch ("ATS") according to an embodiment of the invention. FIG. 2 shows transfer switch 25 in an assembled configuration, with dead front panel 57 having an opening therein to expose switch handles 37, 39 (to facilitate manual operation thereof). ATS 25 includes enclosure 27, into which bus 29 is mounted. Control module (with user interface) 31 is mounted onto bus 29, as are breakers 33, 35, having switch handles 37, 39. Interlock member 41 is mounted to the faces of breakers 33, 35, for reciprocating sliding movement between switch handles 37, 39, along an axis which extends perpendicular to the axes about which switch handles 37, 39 pivot. Breakers 33, 35 are of the type, in which "ON" and "OFF" are at the extremes of the ranges of motion of their respective switch handles 37, 39, with a "flip-over" point (that point at which the springs acting on the switch handle "take over" and drive the handle to the destination toward which it is being driven, without the need for the application further external force) somewhere in between. Some breakers may have their "flip-over" points at exactly midpoint along the arc of possible motion of the switch handle, while other breakers have their flip-over points at locations closer to one end of the range of motion than the other end of the range of motion.

Actuator 43 includes freely rotatable rollers 45, which are configured to bear against the "outside" facing surfaces of switch handles 37, 39. Screw 51 is mounted for free rotation, but no axial movement, relative to breakers 33, 35. Motor 49 encircles screw 51. Actuator 43 is mechanically connected to screw 51, via guide collars 53 and 55, which encircle screw 51. Guide collars 53, 55 straddle motor 49. Accordingly, when motor 49 is energized, it bears against screw 51, and is caused to move longitudinally along screw 51, which, in turn, causes actuator 43 to be moved axially along screw 51, to bear against switch handles 37, 39. In this embodiment, rollers 45 are cylindrical, disc-shaped rollers, mounted on hubs, and having side faces which are parallel to the axes of rotation of the rollers. In practice, while the rollers are free to rotate, during a transfer operation, they do not. The side faces of the rollers make variable contact with the sides of the breaker switches, in that, at some points during the arc of the breaker switch handles, the "lower" edges of the side faces of the rollers are contacting the sides of the breaker switch handles, at other points, there is flat-to-flat contact between the sides of the rollers and the sides of the breaker switches, and at other locations, the "upper" edges of the side faces of the rollers are contacting the sides of the breaker switch handles. The rollers have diameters which are selected because of the dimensioning appropriate to obtain the desired timing of the relative movements of the interlock components and the breaker switch handles. However, because the rollers do not, in this embodiment, rotate significantly as a rule, the portions of the rollers that are "away" from the breaker switch handles are essentially not involved in the interlock operation, and could be replaced, e.g., by solid bulk structures (fabricated from any suitable material, such as metal, polymer, rubber, etc.) having the necessary dimensions in the direction of the breaker switches, as shown in the photo drawing of FIG. 42 hereto. The rectangular bulk structures shown therein will likewise have flat contact faces, extending normal to the plane of the illustration, to provide the "camming" contact action previously described, but will have little or no structure extending on the opposite sides away from the breaker switch handles.

As mentioned previously, the length of interlock member 41 is sufficient to prevent both of switch handles 37, 39 to simultaneously be in their respective "ON" positions. However, the distance between the edges of rollers 45, 47, taken along an axis extending between their respective rotational axes is sufficient to enable both switch handles 37, 39 to be simultaneously in their respective "OFF" positions.

Motor 49 is actuated by suitable control signals transmitted from control unit 31, in response to changes in the quality of the utility power, which is being sensed continuously at very short intervals, by control unit 31.

Figure 2A:
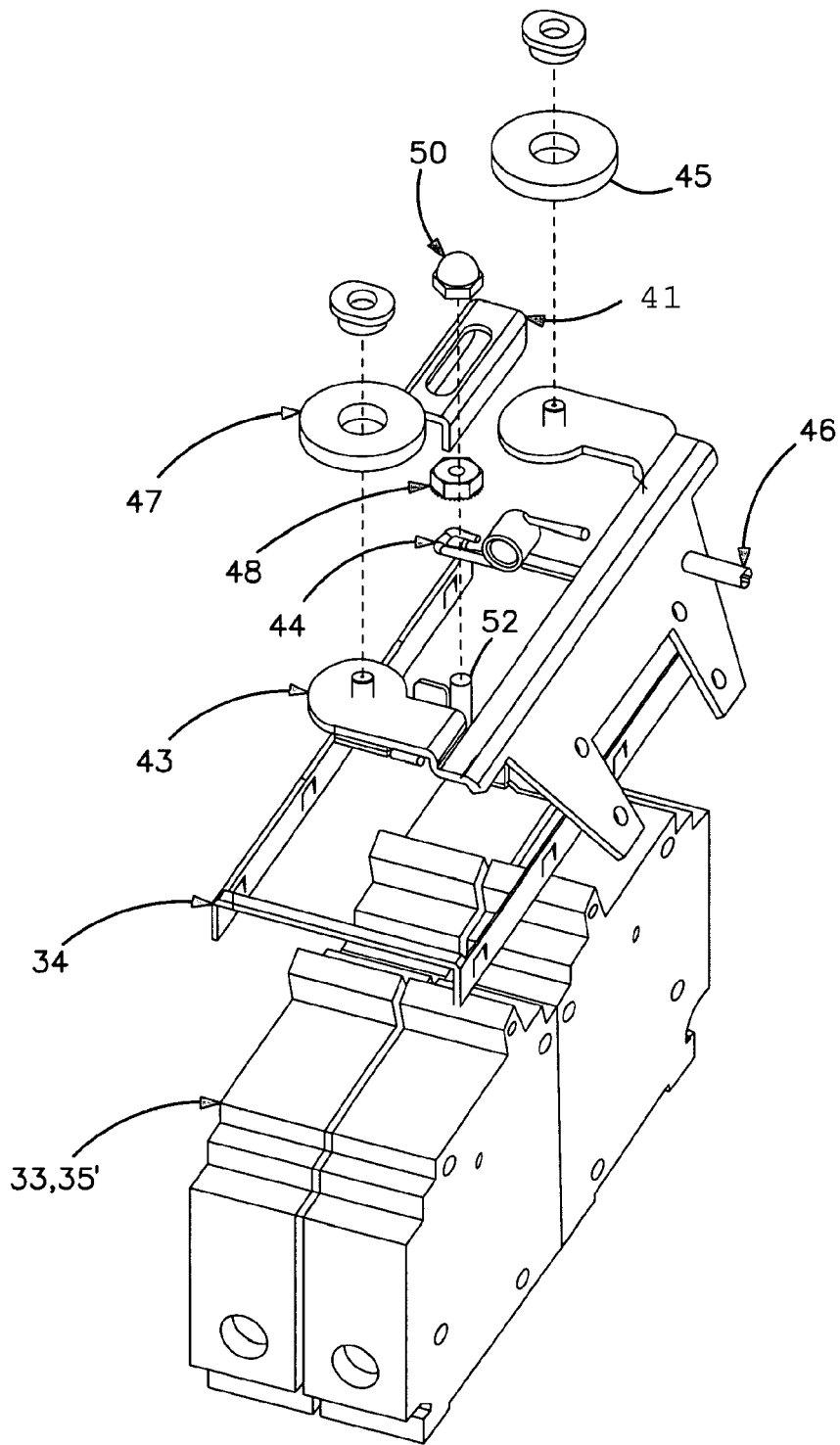

FIG. 2A in particular is an exploded perspective view of the breakers 33, 35; interlock mounting bracket 34; actuator 43; spring 44; spring roller 46; and rollers 45, 47. Interlock member 41 is slidably held by fasteners 48, 50 on post 52 emanating from bracket 34.

The operation of transfer switch 25 may be described with respect to the configuration shown in FIGS. 2-8 wherein switch handle 37 of breaker 33 is in its "OFF" position, and switch handle 39 is in its "ON" position. Switch handle 37 is bearing against an end of interlock member 41, while there is a gap between interlock member 41, and switch handle 37 (being in its fully "ON" position). There is similarly a gap between switch handle 37 and roller 47.

Figure 3:
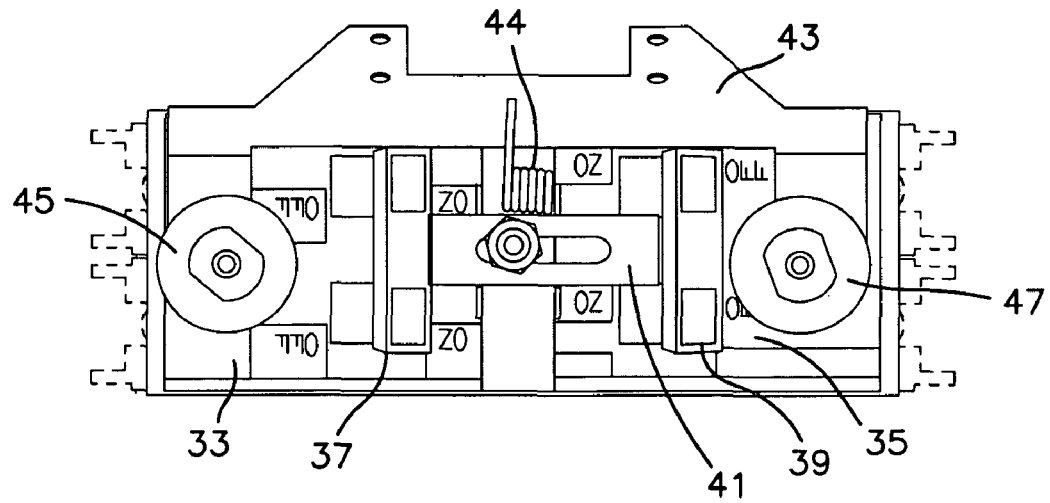
Figure 4:
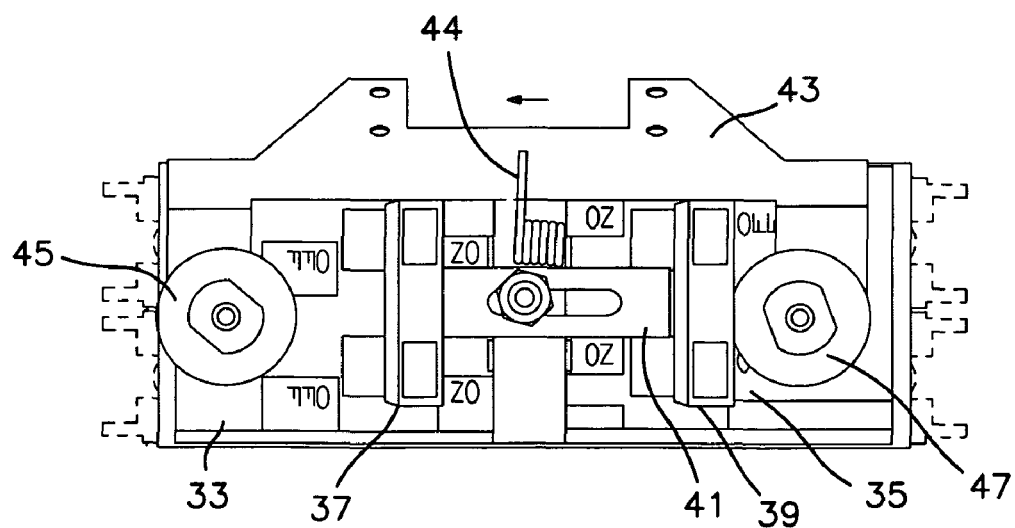
Figure 5:
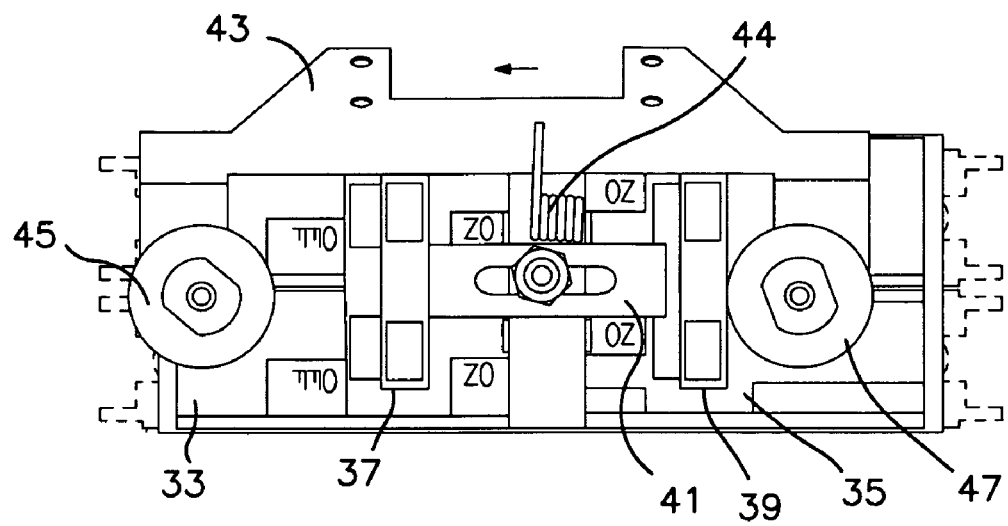
Figure 6:
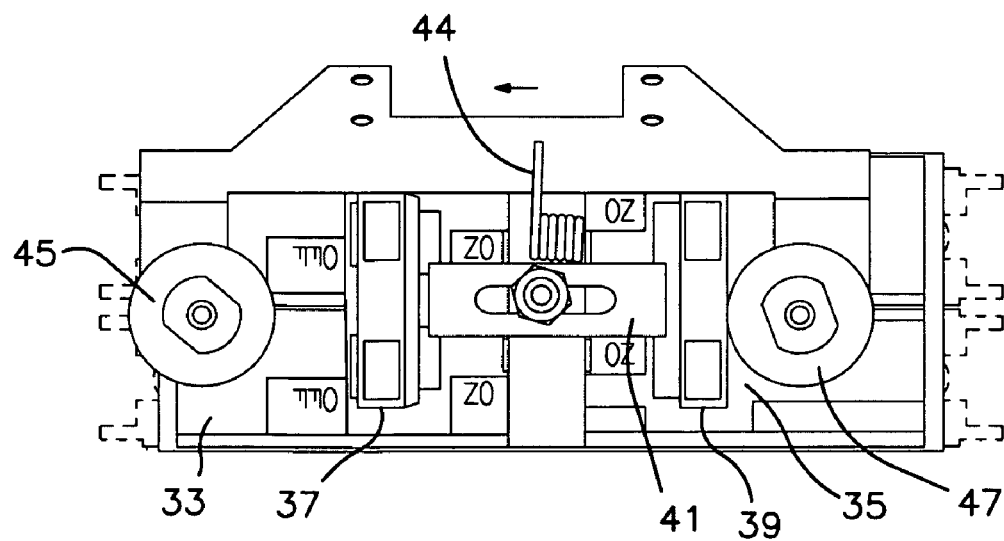
Figure 7:
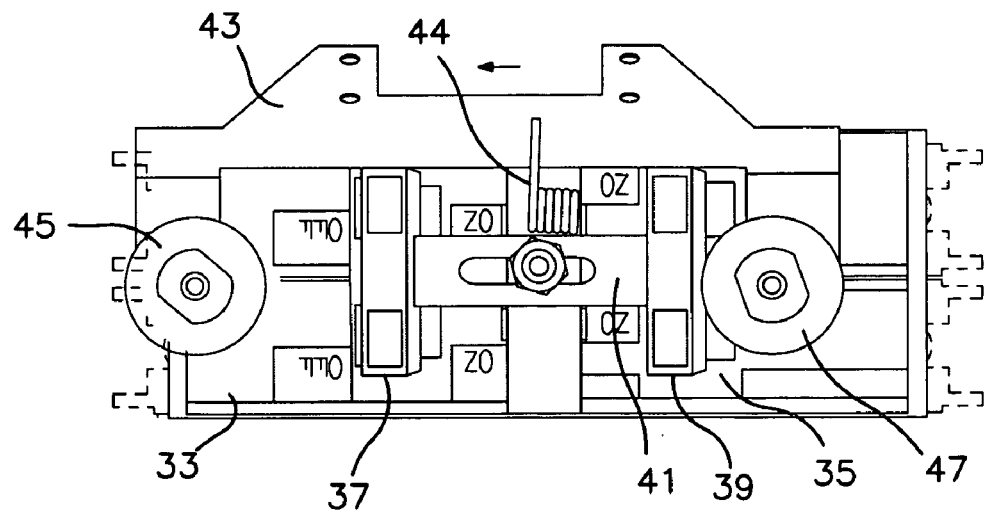

The positions of the switch handles in FIGS. 2, 3 may represent a transfer switch either just before switch over from utility to auxiliary power, or from auxiliary power to utility, depending upon which breaker is connected to which power source. For purposes of this disclosure, FIGS. 2-3 will represent a situation in which breaker 33 is connected to utility power, breaker 35 is connected to an auxiliary generator (or other auxiliary power source), and the configuration depicted represents a status, prior to switchover from utility to generator power.

Control module (with user interface) 31 is connected, via suitable sensory contacts, to both the utility power source and the auxiliary power source, and is operably configured to monitor various preselected parameters (e.g., RMS voltage, current, frequency) of the power being supplied (or available) from each source. Controller 31 will be provided with memory, into which will be programmed predetermined values for one or more of those parameters. For example, control module (with user interface) 31 may be programmed to monitor voltage, and should the average voltage, for a predetermined period of time, drop below a predetermined stored average value, then the control module (with user interface) 31 is programmed to initiate transfer to auxiliary power.

In a system using a fuel-powered generator, control module (with user interface) 31 will be programmed for and suitably connected to, a starter-equipped generator. Once conditions mandating a transfer to auxiliary power have been detected, control module (with user interface) 31 will send crank and ignition signals to the generator, and, once the generator is running and is delivering power above selected start-up values, the start signal will be terminated, but the ignition signal will be maintained, until the generator is no longer needed. As soon as the generator output has reached a predetermined nominal output level, control module (with user interface) 31 will cause the actuation of the transfer switch.

An appropriate signal will be transmitted to motor 49, to cause motor 49 to rotate, so as to be moved along screw 51 to the left, as FIG. 2 is observed, to, in turn, cause actuator 43 to be moved toward the left. Roller 47 will make contact with, and bear against switch handle 39, which will begin to pivot to the left, toward its "ON" position. Before it does so, it will push against interlock member 41, which, in turn, will bear against switch handle 37, and begin to move it out of its "ON" position, up toward its "flip-over" position, on its way to its "OFF" position. As previously mentioned, transfer switches, to be safe, must be configured to disconnect the active power source, before the auxiliary power source can be connected ("break-before-make"), with a momentary time gap of predetermined duration in between, in which both breakers are in their respective "OFF" positions. As such, interlock member 41 is of a length sufficient to ensure that it will drive switch handle 37 to and past its "flip-over" point, to its "OFF" position, well before switch handle 37 (being directly pushed by roller 47) arrives at its "flip-over" point.

Actuator 43 is mounted in such a way as to accommodate a breaker construction in which, for example referring to the arrangement of FIG. 2, breakers 33, 35 are configured such that their flip-over points are not at the midpoint of their respective handles arcs of movement, but are instead at positions closer to their respective "ON" positions. This means that the handle actually has to be pushed beyond the centerpoint of the arc, against the force of the spring. As such, rollers 45, 47 must be able to "pass" the positions of the pivot axes of switch handles 37, 39. To do so, actuator 43 can pivot, slightly relative to screw 51, away from the faces of breakers 33, 35, to enable rollers 45, 47 to "climb up" the inclined faces of switch handles 37, 39, when they are pushed past the midpoints of their arcs of travel. A projecting tail end of coil spring 44 serves to push actuator 43, and, in turn, rollers 45, 47, against the faces of breakers 33, 35, inasmuch as, depending upon the direction that motor 49 may be turning at any particular phase of operation of transfer switch 25, the reactionary torque exerted by screw 51 on motor 49 may tend to pivot actuator 43 away from the faces of breakers 33, 35.

Once the transfer has been completed (with switch handles 37, 39 being situated at their opposite ranges of motion, from those shown in FIG. 2), transfer switch has now connected the household electrical circuit with auxiliary power. Control module (with user interface) 31 may be programmed to keep motor 49 and, in turn, actuator 43, at the position actuator 43 attains, just as breaker switch handle 39 meets and is propelled past its flip-over point. Alternatively, motor 49 may be actuated to move back to the position depicted in FIG. 2, which is a position where breaker 35 is in its "OFF" position, but, if desired, breaker 33 could be flipped manually to its "OFF" position at the same time.

Figure 8:
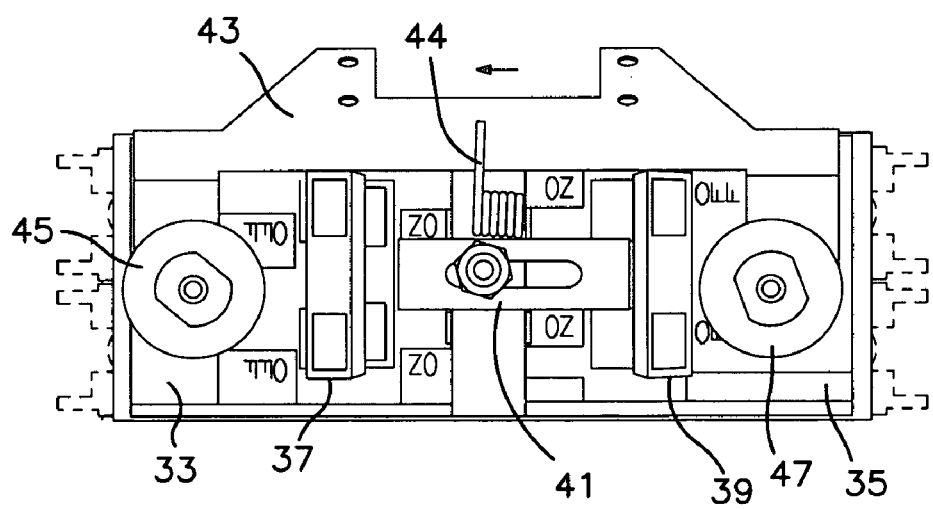
Figure 8A:
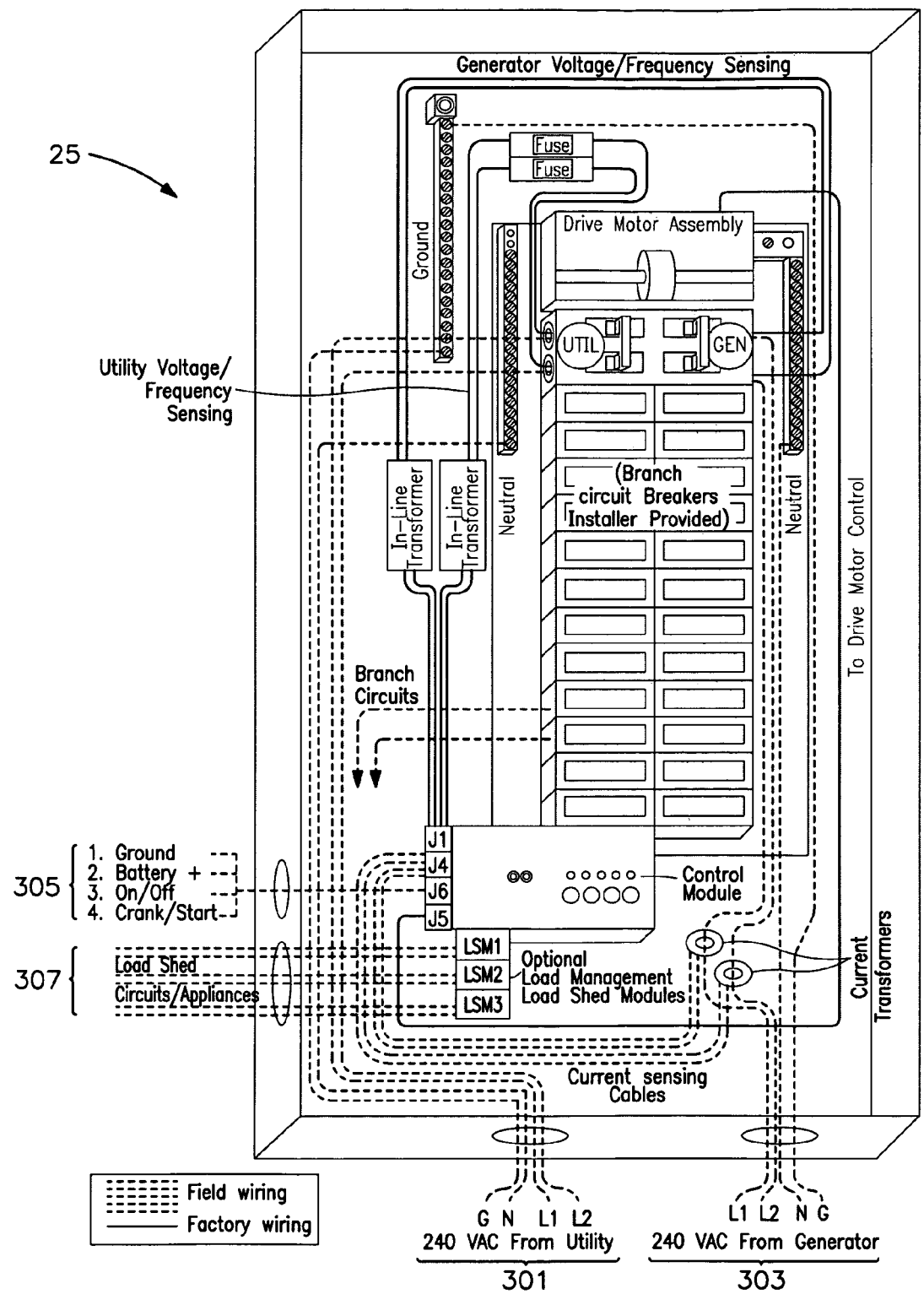
FIG. 8A is a representative wiring schematic for an automatic transfer switch according to the embodiment of FIGS. 2-8.
Figure 9:
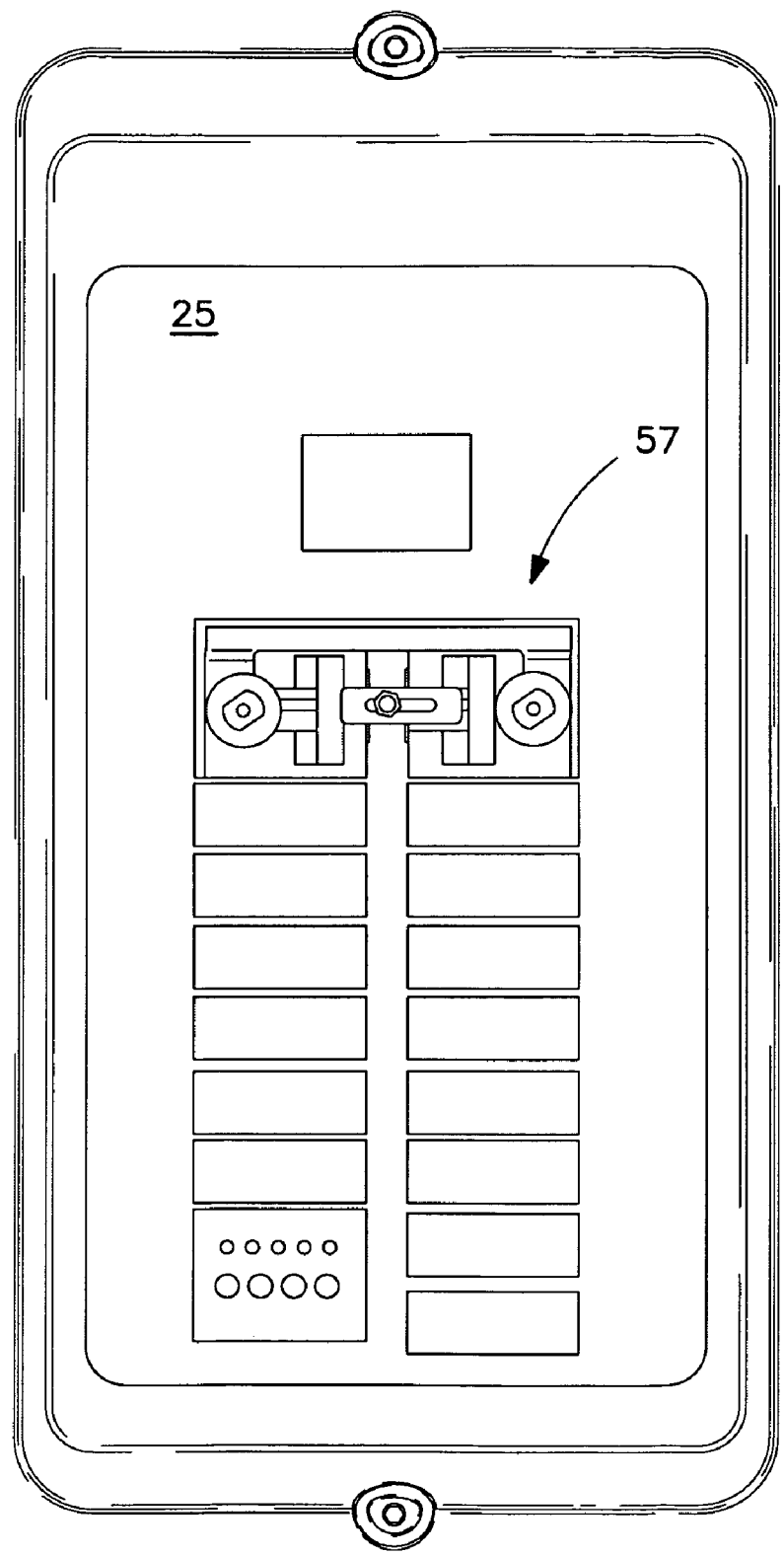
FIG. 9 is an illustration of an automatic transfer switch according to the embodiment of FIGS. 2-8, showing in particular, the enclosure and the interlock mechanism.
Figure 10:
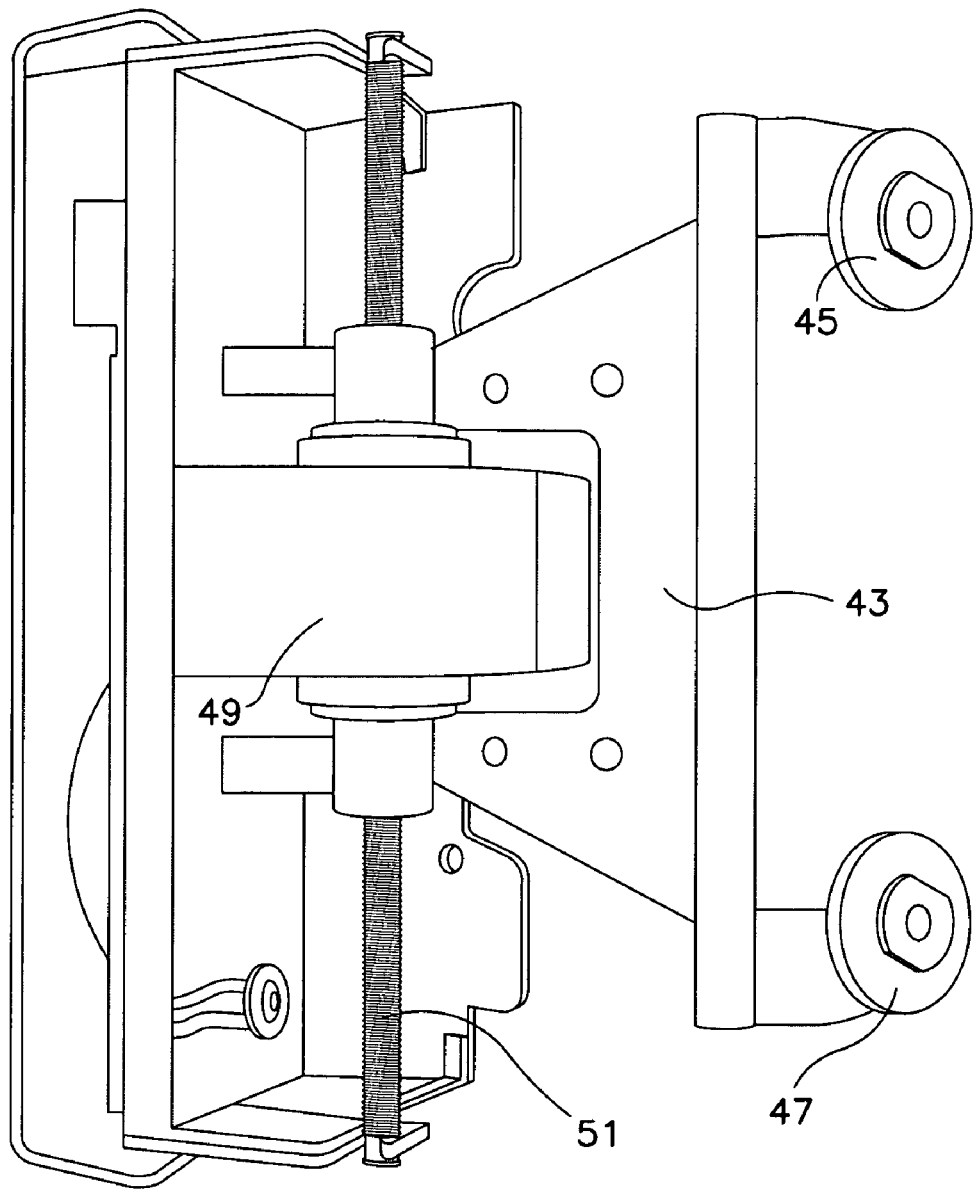
FIG. 10 is an enlarged view of the motor and actuator associated with the interlock mechanism for the automatic transfer switch of the embodiment of FIGS. 2-9.

A representative wiring schematic for an automatic transfer switch according to the embodiment of FIGS. 2-8 is provided in FIG. 8A, showing, in particular, the connections 301 for input of power from utility, connections 303 for input of power from the auxiliary generator, control connections 305 to the auxiliary generator, and power connections 307 to the electrical circuits which may be regulated by load management/load shed modules, as discussed elsewhere herein.

Interlock mechanism 105 (shown in exploded perspective view in FIG. 20A). is mounted on breakers 111, 113, and includes base plate 119; actuator 129 with arm 139; interlock 121, and rollers 121, 123, 125 and 131.

The output of the auxiliary power source will be monitored by control module (with user interface) 31, just as the utility power source will continue to be monitored, during operation of the auxiliary power source. Should a voltage be detected from the utility power inputs that equals or exceeds a stored, predetermined value, for a minimum predetermined period of time, transfer switch 25 will initiate a transfer back to connection to utility power.

To revert to utility power, control module (with user interface) 31 will cause motor 49 to be actuated so as to move toward breaker 35. Roller 45 will bear against the adjacent side of switch handle 33, which will push on interlock member 41, which will push on switch handle 39. Switch handle 39 will reach its flip-over point, and arrive at its "OFF" position, before roller 45 can push switch handle 37 into its flip-over point. Again, once both breakers have been tripped, control module (with user interface) 31 may either leave motor 49 and actuator 43 at their positions after flip-over of switch handle 37 has occurred, or it may be returned to the centralized position of FIG. 2.

FIGS. 11-19 show an automatic transfer switch 60 according to an alternative embodiment of the invention. Power buss 64 provides power and/or data to control module (with user interface) 66 for regulating interlock mechanism 76. Breakers 68, 70 (with corresponding switch handles 72, 74) are mounded side by side, rather than in tandem, as was the arrangement with respect to the embodiment of FIG. 2. Because some breakers, which are typically sold in incremental sizes and power ratings, vary in size, as well as in the location of the flip-over points for their switch handles, in order to provide an automatic transfer switch in accordance with the principles of the present invention in an economic and space-saving manner (e.g., to accommodate an off-the-shelf approved metal enclosure), it may be desirable to arrange the breakers in a side-by-side manner. The interlock mechanism of Fig. B addresses such breaker configurations.

Figure 11:
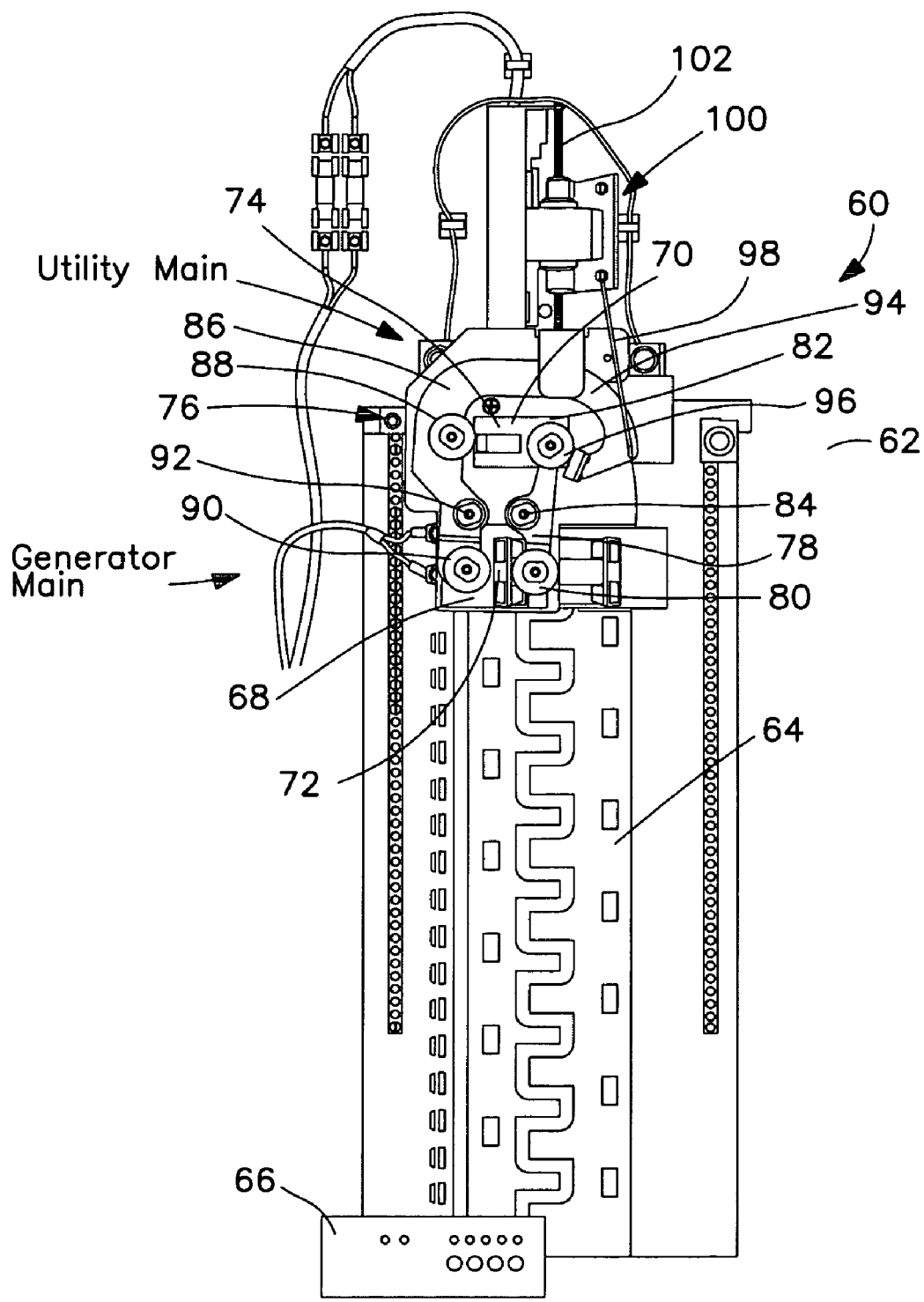
FIG. 11 is an illustration of an automatic transfer switch, according to another embodiment of the invention, shown in its enclosure, with the dead front panel removed, to reveal the buss, controller, and motor for driving the interlock mechanism.
Figure 11A:
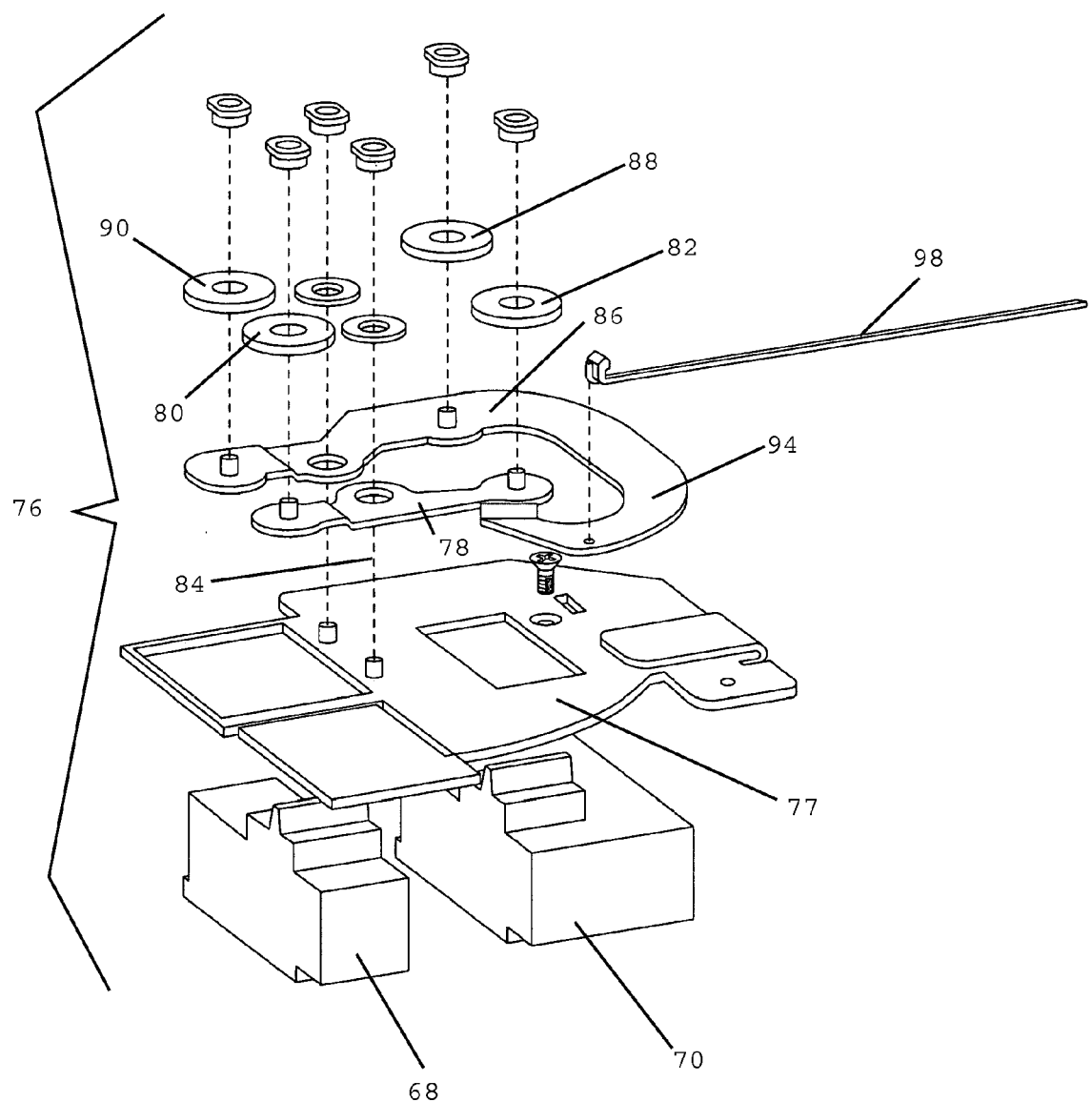
FIG. 11A is an exploded perspective view of the interlock mechanism according to the embodiment of FIG. 11.

Interlock mechanism 76, in accordance with FIG. 11A, includes breakers 68, 70; base plate 77; interlock member 78; actuator 86 with arm 94; rollers 80, 90, 88, 82; and a prime mover or drive rod 98.

Base plate 77 is mounted to breakers 68, 70, or to buss 64, or even directly to enclosure 62, if so desired. Apertures are provided in base plate 77, through which switch handles 72, 74 project, and are free to pivot throughout their respective arcs of motion (which may, in some embodiments, be different for each breaker). Interlock member 78 is mounted for pivoting movement around axis 84, to base plate 77, and is provided with freely rotating rollers 80, 82. Actuator 86 is likewise mounted for pivoting movement, around axis 92, to base plate 77, and is provided with freely rotating rollers 88, 90. Actuator 86 further includes arm 94 and pusher 96. Arm 94 is connected, via drive rod 98, to motor assembly 100, which, as in the embodiment of FIG. 2, is configured for reciprocating movement along screw 102, depending upon which direction motor assembly 100 is being directed to run. Breakers 68, 70 are mounted side-by-side, in the embodiment illustrated, happen to have switch handles having different "throws". Accordingly, interlock mechanism 76 is advantageously configured to address this configuration.

Figure 12:
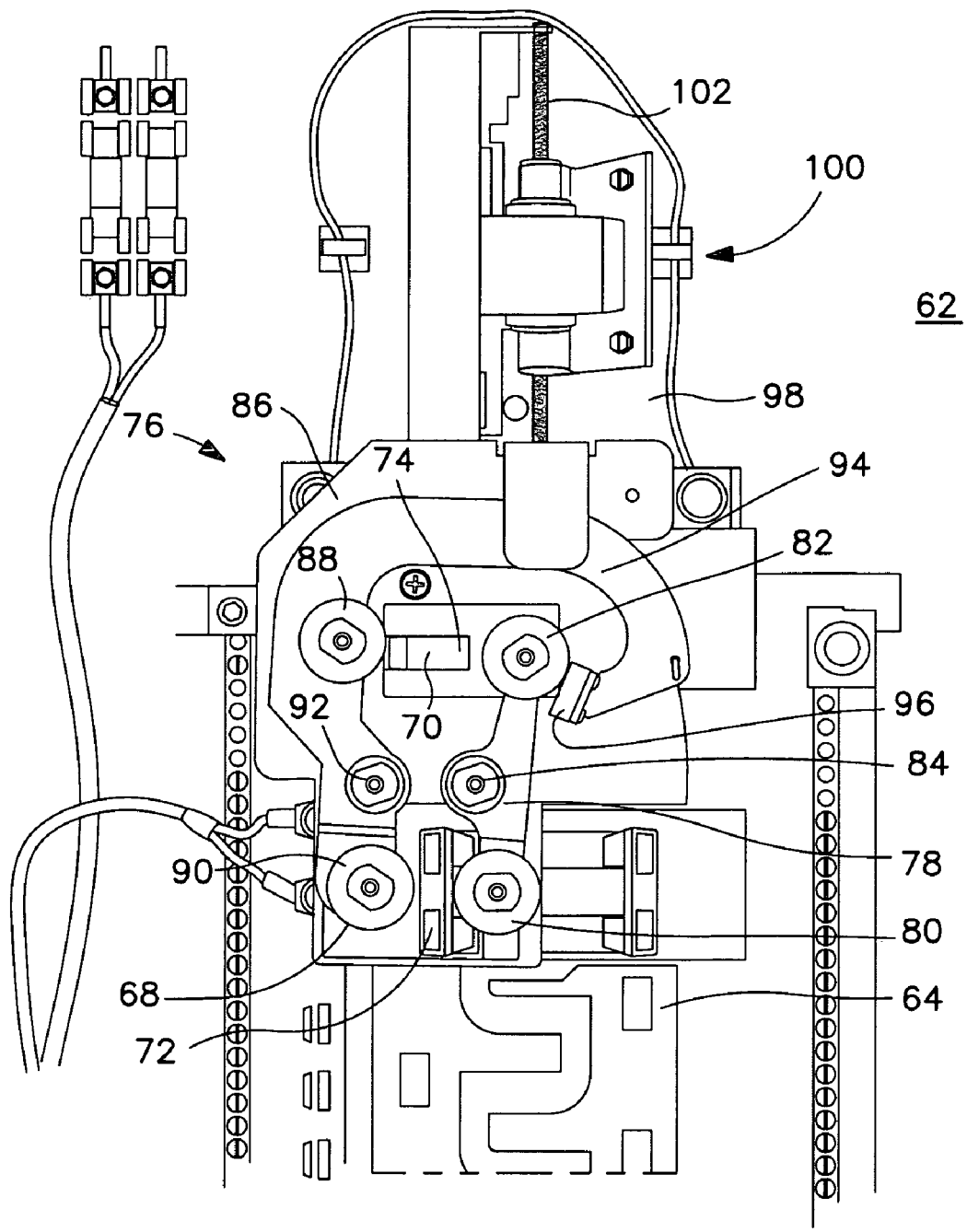
FIG. 12 is an enlarged view of the interlock mechanism according to the embodiment of FIG. 11.
Figure 13:
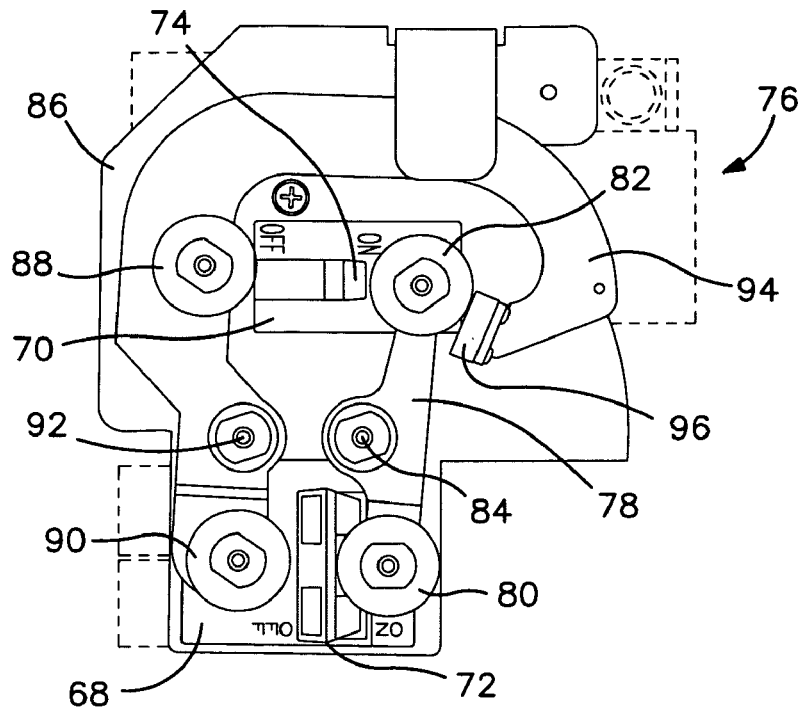
FIGS. 13-18 are schematic illustrations of an interlock mechanism (omitting the motor) for an automatic transfer switch according to the embodiment of FIG. 11, showing a transfer procedure.
Figure 14:
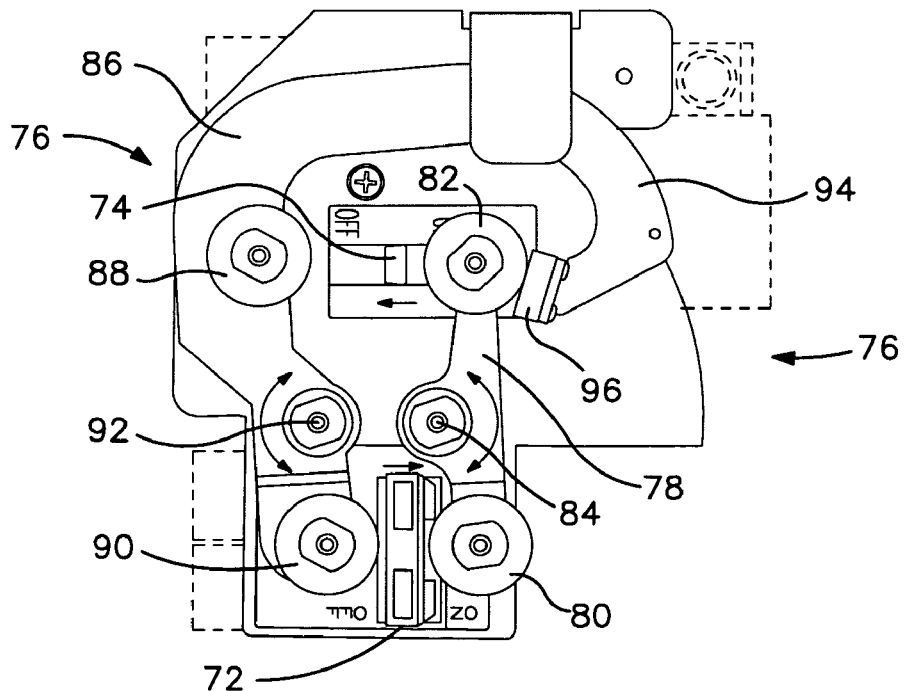
Figure 15:
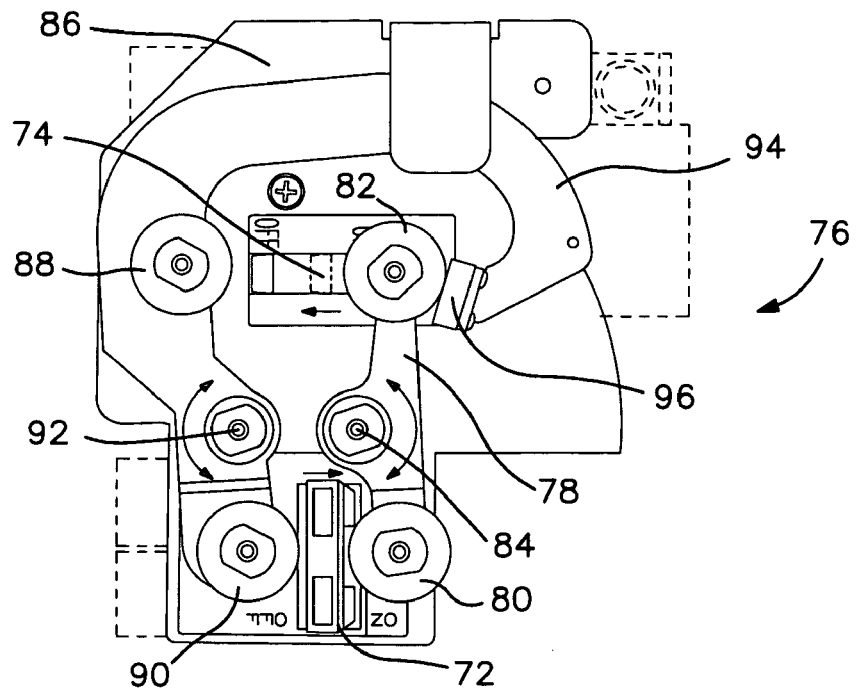
Figure 16:
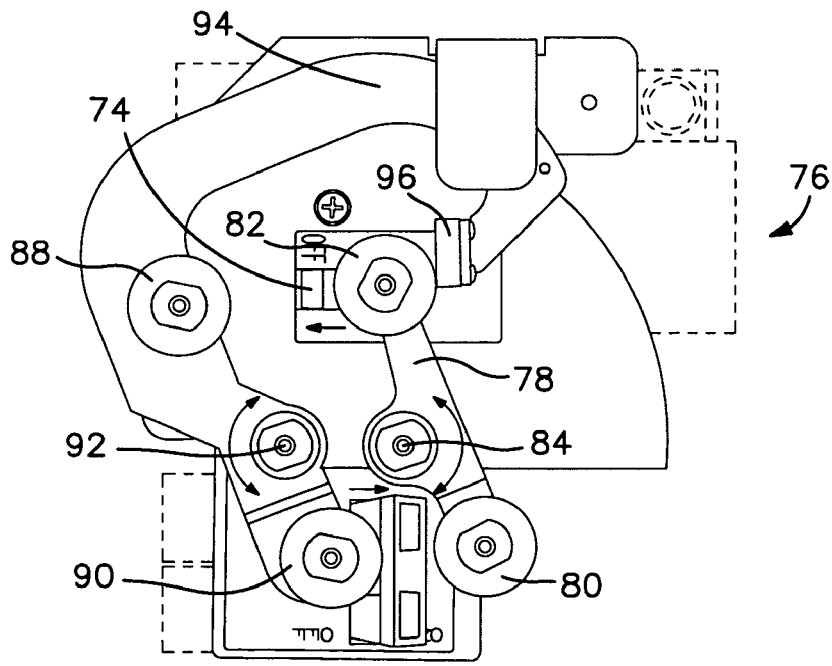
Figure 17:
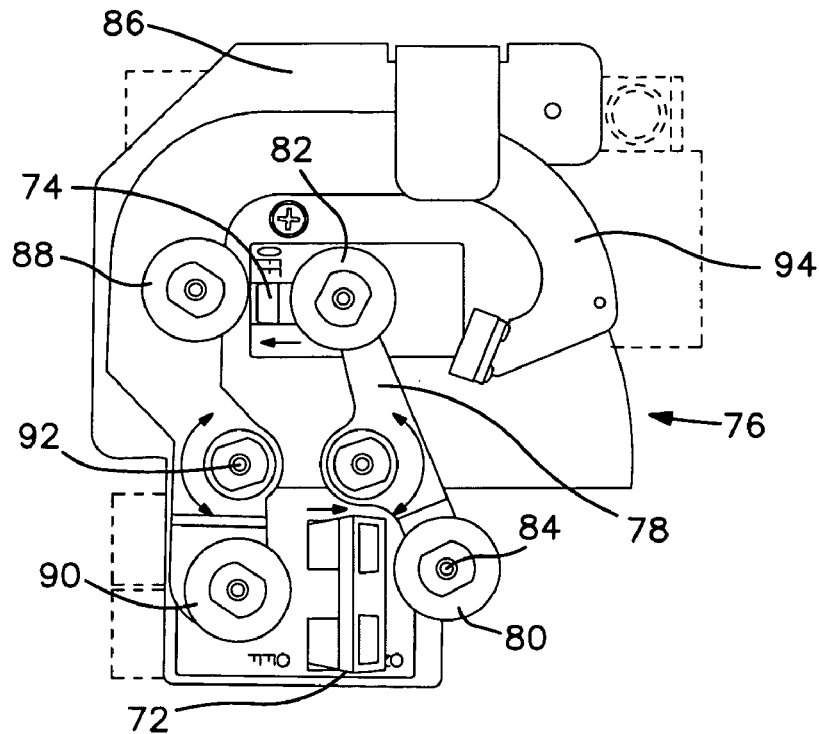
Figure 18:
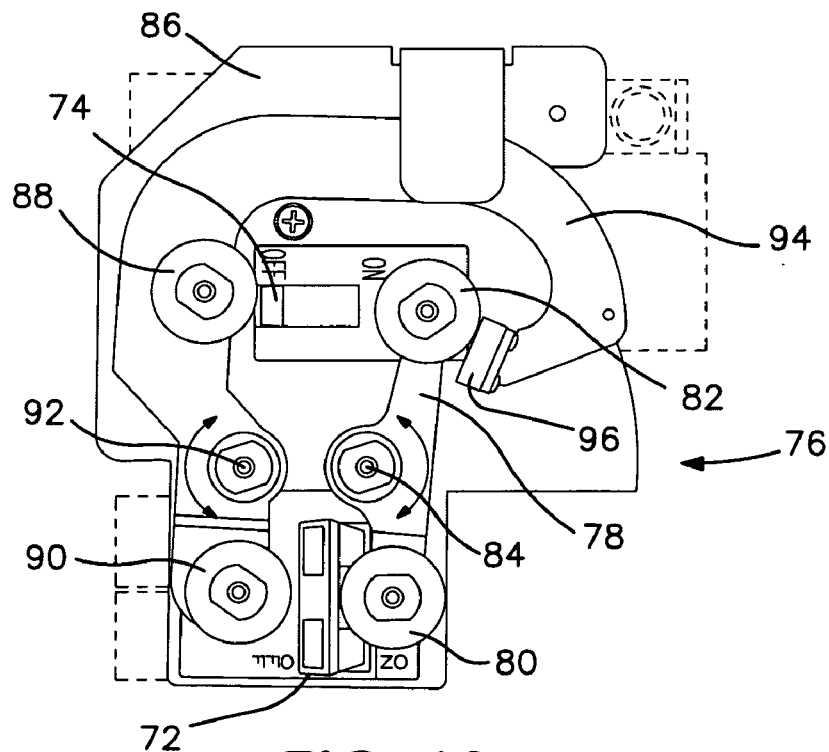

FIG. 12 is an enlarged view of interlock mechanism 76. In the embodiment of FIGS. 11 and 12, the "OFF" positions of switch handles 72, 74 are to the left, as those figures are viewed, and the "ON" positions are to the right. Although other arrangements may be used, for purposes of the present disclosure, breaker 68 will be deemed to be connected between the auxiliary power source (not shown) and the household power circuit, while breaker 70 will be considered to be connected between utility power and the household power circuit. Accordingly, as shown in FIGS. 11-12, transfer switch 60 is set up so that switch handle 74 of breaker 70 is in its "ON" position, and switch handle 72 of breaker 68 is in its "OFF" position. Thus, the configuration of FIGS. 11-12 corresponds to a situation in which utility power is being sent to the household circuit, and (auxiliary power) breaker 68 is off.

Therefore, in operation, to switch from utility power to auxiliary power, control module (with user interface) 66 monitors utility power characteristics. If the requisite power supply behavior is detected, control module (with user interface) 66 first prepares the auxiliary power source (not shown), for operation by sending crank and ignition signals to the auxiliary power source (if it is a starter-equipped fuel-powered generator). Once the generator has attained the necessary minimum output parameters, the crank signal is halted. Control module (with user interface) 66 then transmits a signal to motor assembly 100, causing it to propel itself along screw 102, away from interlock assembly 76. Drive rod 98 moves upwardly (as Figs. B and C are viewed), pulling arm 94, and causing actuator 86 to pivot counterclockwise, around pivot point 92. Before pusher 96 engages roller 82, roller 90 is advantageously positioned so as to begin to push (to the right) against (auxiliary power breaker) switch handle 72. Before switch handle 72 reaches its flip-over point, switch handle 72 contacts roller 80. Interlock mechanism 76 is configured so that at approximately the same time, pusher 96 engages roller 82 which, in turn, pushes on (utility power breaker) switch handle 74. The distance between pivot axis 84 and roller 82 being greater than that between pivot axis 84 and roller 80, roller 82 pushes switch handle 74 to (and through) its flip-over point (to break the connection between utility power and the household circuit) before roller 90 can push switch handle 72 to its flip-over point (to engage the auxiliary power source to the household circuit).

In the reverse process, motor assembly 100 moves toward interlock assembly 76, so as to cause drive rod 98 to push actuator 86 in a clockwise direction. Roller 88 pushes against utility breaker switch handle 74, which in turn pushes against roller 82, causing interlock member 78 to pivot. Roller 80 pushes auxiliary power breaker switch handle 72 out of its "ON" position, and through its flip-over point, before roller 88 can push utility breaker switch handle 74 to and through its flip-over point to its "ON" position.

As with the embodiment of FIG. 2, interlock mechanism 76, in an embodiment of the invention, is configured so that there is a neutral position for actuator 86 such that interlock member 78 permits both breaker switch handles 72, 74, to be in their respective "OFF" positions simultaneously, but not permit both handles 72, 74 to simultaneously in their respective "ON" positions. Likewise, control module (with user interface) 66 may be configured to cause the interlock mechanism to be returned to the neutral position after each switching operation, or to cause the interlock mechanism to simply remain at whichever position it occupies, immediately after a completed switching operation, as may be desired.

Figure 19:
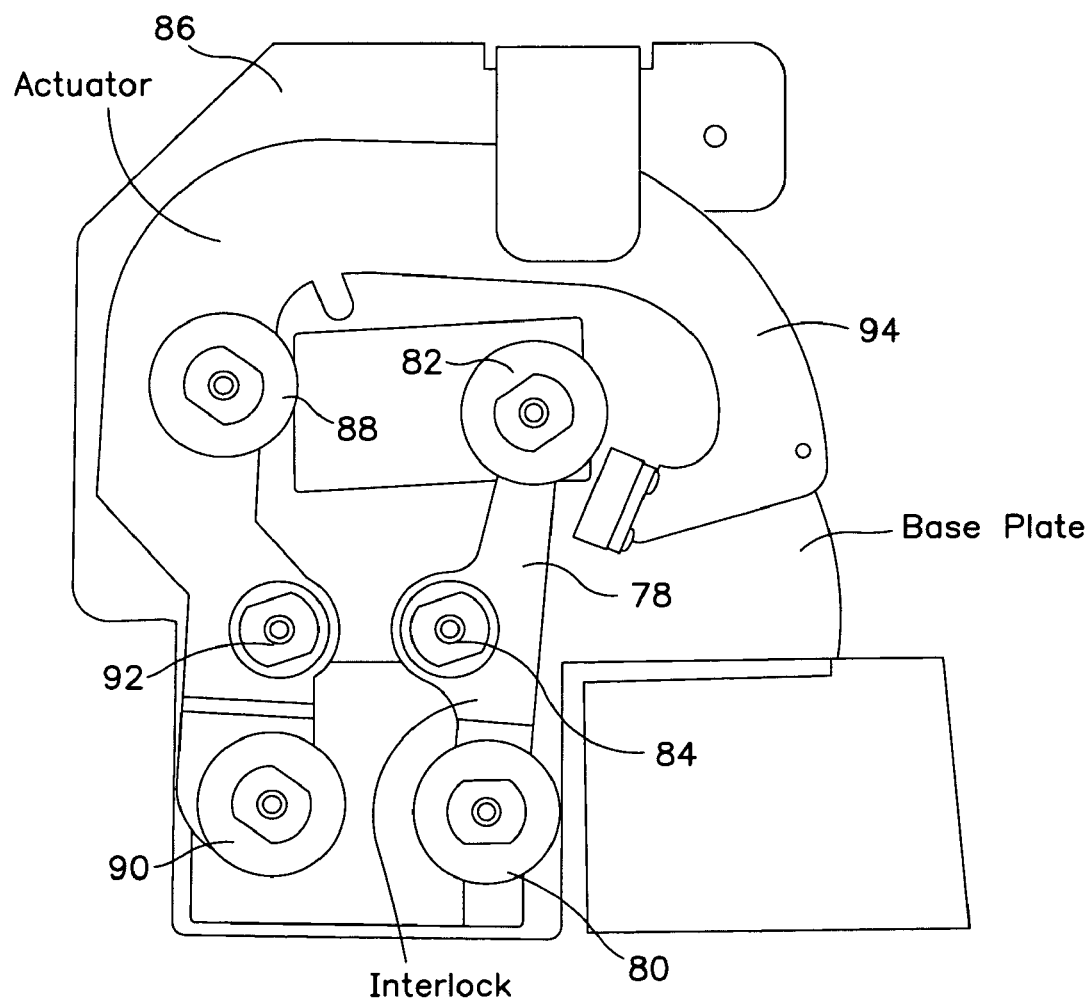
FIG. 19 is an enlarged view of components of the interlock mechanism according to the embodiment of FIG. 11.
Figure 19A:
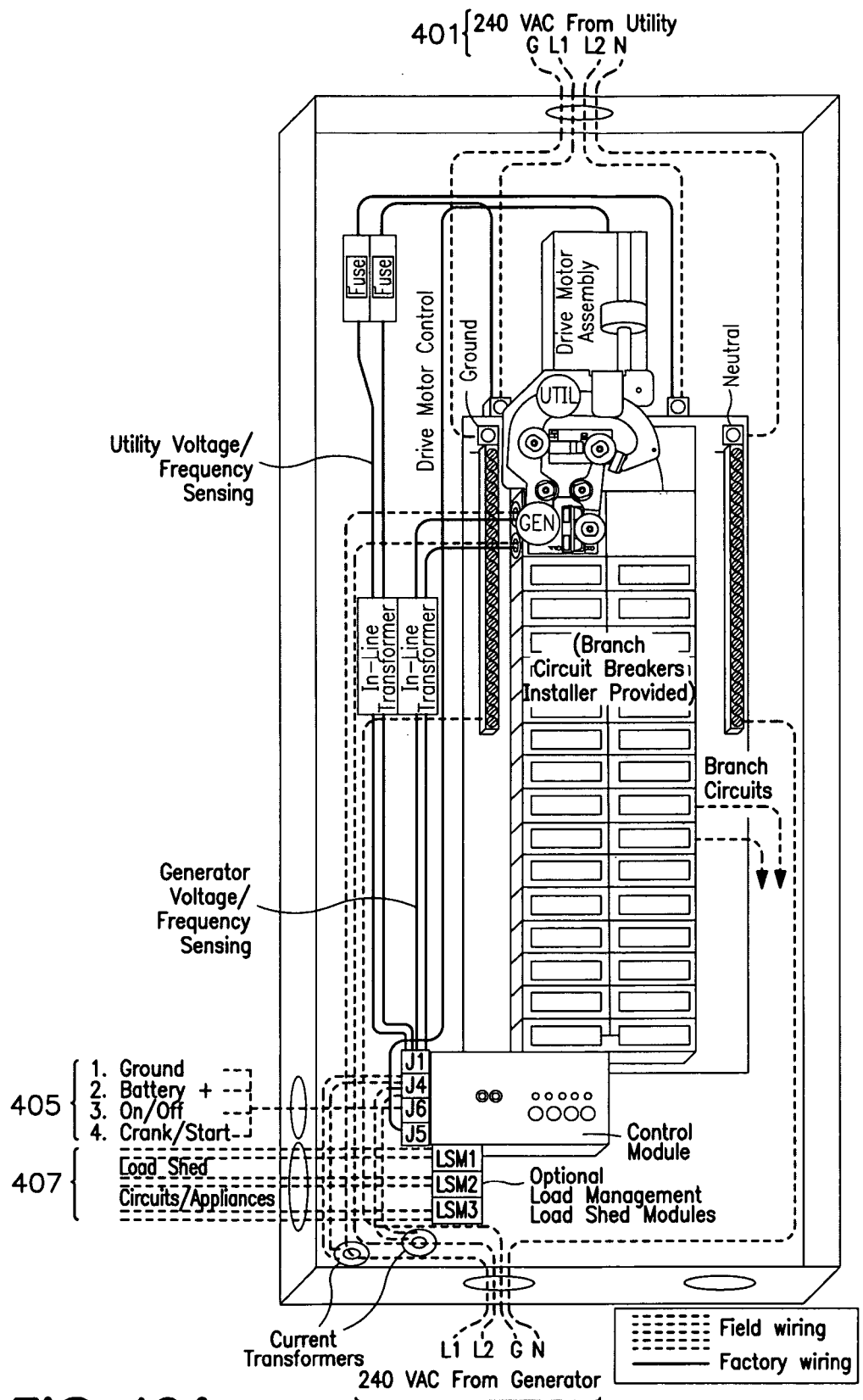
FIG. 19A is a representative wiring schematic for an automatic transfer switch according to the embodiment of FIGS. 11-19.

A representative wiring schematic for an automatic transfer switch according to the embodiment of FIGS. 11-19 is provided in FIG. 19A, showing, in particular, the connections 401 for input of power from utility, connections 403 for input of power from the auxiliary generator, control connections 405 to the auxiliary generator, and power connections 407 to the electrical circuits which may be regulated by load management/load shed modules, as discussed elsewhere herein.

Figure 22:
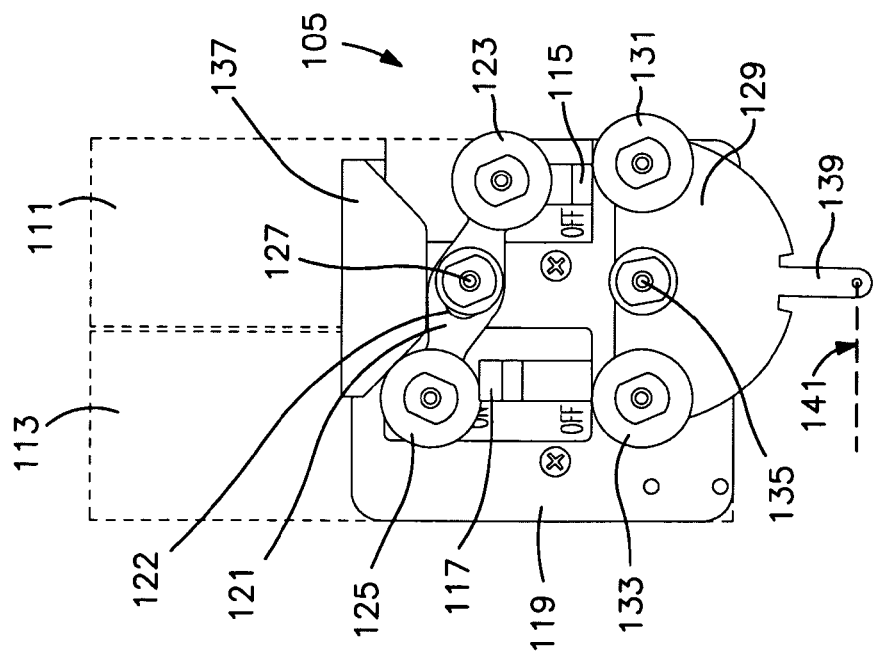

FIGS. 20-27 illustrate another automatic transfer switch according to an another embodiment of the invention, which is also directed to a construction incorporating side-by-side breaker switches 111, 113. In the embodiment of FIGS. 20-27, the breakers are symmetrical, but provided with long throws, in which the flip-over points, for going from "ON" to "OFF", and from "OFF" to "ON" are not at the same location, but rather are at points far past the midpoint of the arc, in each direction that the switch handles 115, 117 are being pushed. For example, FIG. 22 illustrates interlock mechanism 105, with actuator 139 in its neutral position. Switch handle 115 of auxiliary power breaker 111 is in its "OFF" position. In order for it to reach its flip-over point, to be "self" propelled into its "ON" position, breaker switch handle 115 has to be pushed far past the midpoint of the arc of its possible movement. Conversely, switch handle 117 of utility breaker 113 is in its "ON" position. In order for it to reach its flip-over point, to be "self" propelled the rest of the way into its "OFF" position, breaker switch handle 117 has to be pushed far past the midpoint of its arc of possible movement, toward its "OFF" position.

FIGS. 22-27 illustrate the process for switching over from utility power to auxiliary power. As in the other embodiments, control module (with user interface) 109 monitors the condition of the utility power supply, and if the condition(s) warranting changeover to auxiliary power are met, control module (with user interface) initiates a switchover by first preparing the auxiliary power supply, as described herein with the preceding embodiments. Once the auxiliary power supply is ready, control module (with user interface) 109 actuates motor assembly 143, to cause drive rod 141 to be moved upwardly (FIG. 21; to the right, in the view of FIGS. 22-27). Actuator 129 is moved counterclockwise, causing roller 131 to push against switch handle 115, which, in turn, bears against roller 123, which is mounted on interlock member 121. Interlock member 121 is mounted for pivoting movement around pivot 127, but is also provided with elongated slot 122, so that interlock member 121 may shuttle from side-to-side, as described in further detail hereinafter.

Figure 23:
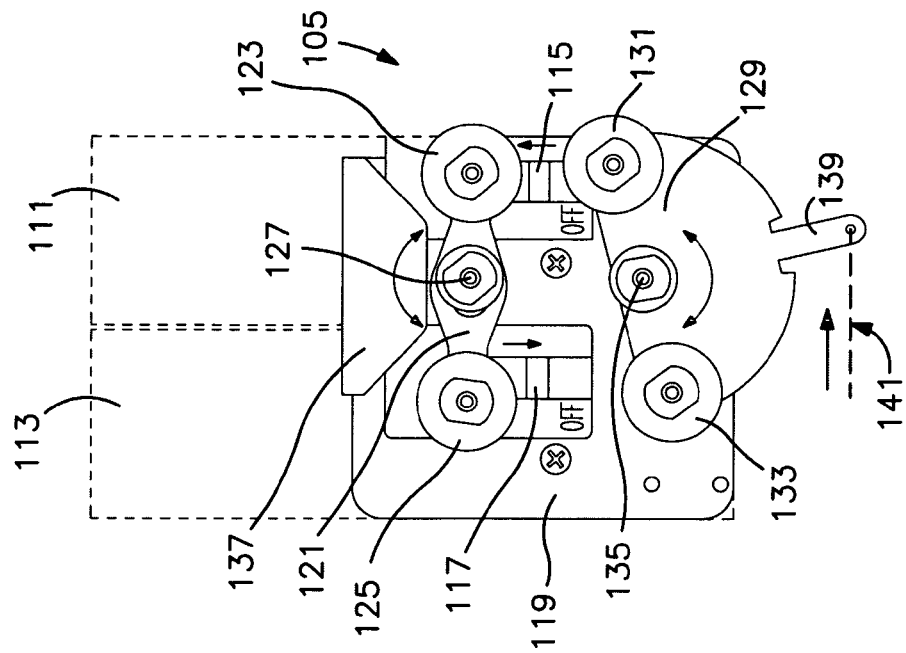
Figure 24:
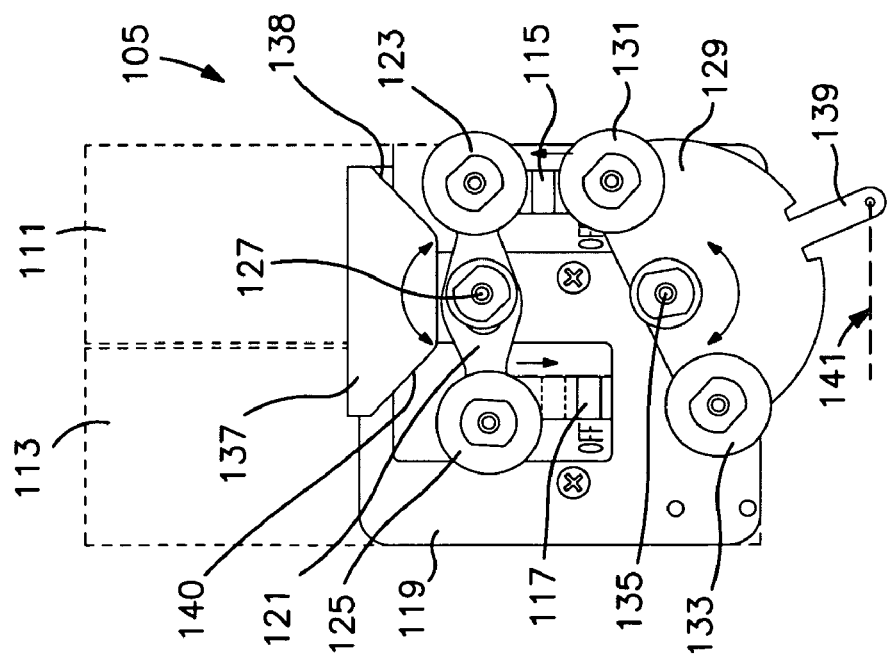

As the switchover process continues, and interlock member 121 pivots, roller 125 bears against switch handle 117 of utility breaker 113, through to its flip-over point (FIGS. 23-24). Actuator 129 continues to move counterclockwise, causing switch handle 115 to push roller 123 to bear against edge 138 of guide plate 137. Actuator 129 continues to pivot, and roller 123 moves up and to the right along edge 138 (as shown in FIGS. 25-27), which movement is enabled by the presence of slot 122. Eventually, the flip-over point for switch handle 115 is reached (FIGS. 26-27), and auxiliary power is engaged. Control module (with user interface) 109 is suitably programmed at this point, in an embodiment of the invention, to move actuator 129 back to its neutral position (FIG. 27). As in the other embodiments, the interaction of the actuator, switch handles, interlock member and, in this embodiment, the slot and guide member, cooperate to ensure that the breaker which is engaged, is disengaged prior to the engagement of the breaker being switched to ("break before make"). As interlock assembly 105 is symmetrical, the procedure for switching back to utility power from auxiliary power is the mirror image of the steps and movements illustrated in FIGS. 22-27.

A representative wiring schematic for an automatic transfer switch according to the embodiment of FIGS. 21-27 is provided in FIG. 27A, showing, in particular, the connections 501 for input of power from utility, connections 503 for input of power from the auxiliary generator, control connections 505 to the auxiliary generator, and power connections 507 to the electrical circuits which may be regulated by load management/load shed modules, as discussed elsewhere herein.

An additional advantageous feature of the automatic system of the present is the ability to automatically shed loads when the capacity of the auxiliary generator is insufficient to handle all of the loads in a given installation. For example, a typical household may have many high current loads such as air conditioning, water heater, or electric range, among others. For reasons of generator cost and fuel consumption, most installations have auxiliary generators that do not produce enough output power to run all of these loads simultaneously. In the event of a utility power failure resulting in a switchover to auxiliary generator power some means of disconnecting these loads has to be provided in order to prevent overloading the generator.

The automatic transfer switch of the present invention is configured to automatically shed up to six different loads. Each load shed circuit provides a form 'C' relay contact that can be wired in series with the coil of a high current contactor. The contacts of high current contactors are typically used to turn 'on' and 'off' loads like air conditioners, spas, water heaters, ranges, etc. By wiring the high current contactor coil through the load shed relay contact allows the load shed relay to have control of these high current loads. As mentioned above, each load shed circuit provides a form 'C' relay contact, namely, a N.O. (normally open) and a N.C. (normally closed) contact. At installation, the installer will use either the N.C. or N.O. contact depending on the type of circuit needed. As an example, the N.C. contact will be used in air conditioning circuits and the N.O. contact will be used in water heater circuits.

An ATS according to the present invention will be provided with a programmable (or preprogrammed) control module that is used to control all of the functions of the ATS. FIG. 28 is a schematic illustration of a representative control panel for an automatic transfer switch according to the present invention, showing the function buttons used during the self-learning mode used during installation or reprogramming of the automatic transfer switch. The control module may be provided with a microprocessor and various software routines, using known components and programming techniques, to provide the control functions as discussed hereinbelow. The circuit for the load shed relay is contained on a smaller printed circuit board ("PCB") that is plugged into the main PCB of the control Module. In the interest of packaging and cost, there are may be independent circuits to each load shed module.

The user interface (part of control module 31) typically may be provided with several main function buttons, e.g., "TRANSFER" 201; "GENERATOR START/STOP" 203; "EXERCISE" 205; "RESET" 209. In addition, typically, there will be five indicator lights (typically LEDs), designed in FIG. 28 by reference numerals 211, 213, 215, 217 and 218. Through these input buttons and the LEDs, an operator may obtain various information and perform various set-up functions as described herein. For example, if utility power is available, indicator 2 (ref. 213) will be continuously lit; if utility power is powering the load, indicator 1 (ref. 211) will be continuously lit. Alternatively, if generator power is available, indicator 4 (ref. 217) will be continuously lit, and if generator power is powering the load, indicator 5 (ref. 218)

will be continuously lit. The control module may further be programmed, using conventional programming techniques, to provide additional information about the operation of the generator, the process of transfer from one power source to another, the condition of the transfer switch drive motor, the generator starter, generator battery monitoring, and the like, depending on which of the indicators is lit and how (whether continuously or flashing, and if flashing, whether slow or fast).

As mentioned previously, rotary dial 202 is used to select the appropriate rating which matches the auxiliary power source (generator, typically) that is connected to the electrical system. In addition, rotary dial 204 is used to select the interval for exercising the generator in non-emergency conditions (e.g., 0, 7, 14 or 28 days). In an embodiment of the invention, for reasons of manufacturability, the control module 31 may be configured to operate with several different embodiments of the ATS of the present invention; hence, several separate selector scales may be provided for selecting the interval, with each scale being unique to a particular ATS embodiment.

Physically, the user interface is the front face panel of control module 31, wherein the control circuitry comprises a main printed circuit board with a microprocessor, containing a combination of programmable and preprogrammed software. The load shed modules described herein comprise plug-in modules that are fitted to appropriate sites on the main printed circuit board. Each load shed module, which is configured to serve to control two (2) electrical circuits in the system that have been designated as "load shed" circuits, functionally is connected to the control circuits for the relays or breakers that, in turn, control the flow of current to the particular circuits, systems or appliances which each particular load shed module serves. For example, a module, designated for purposes of discussion as Load Shed Module 1 (LSM1) may have, as one of its assigned circuits, the air conditioning system of the structure. Depending upon the age of the air conditioning system, it may be more expeditious to connect LSM1 not to the thermostat or other consumer-accessible control of the AC, but rather to connect LSM1 to the power supply for the compressor unit. In that way, when the ATS control module, in performing its functions, "decides" that the AC may receive power, the control module, via LSM1, will either instruct the relay powering the compressor to close (if it is normally open), or instruct the relay to open (if it is a normally open relay), without regard to whether the thermostat theoretically controlling AC operation is calling for the AC compressor to run. Each load shed module is thus connected to its respective designated circuits both to "sense" whether those circuits are demanding power, and to the control relays or breakers (which are powered relays or breakers) which govern the supply of power to those designated circuits. The several load shed loads will be connected to the (in the present disclosure) up to three load shed modules in descending order of priority (e.g., LSM1 will get the two highest priority sheddable loads, LSM2 will get the next two and LSM3 will get the last two).

While in the embodiment described herein, six separate circuits may be accommodated for load shedding operation, in alternative embodiments of the invention, greater or fewer numbers of circuits may be regulated through load shedding. Referring to the present disclosure, six load shed circuits (using 3 load management modules) are setup on a priority basis, denominated Priority 1 through 6 in descending order. At the time of installation of the ATS, an installer would preferably set the priority of the loads in order of importance to the customer, without reference to the load status of the system, at the time of installation. For example, if air conditioning is most important to that customer then it should have priority one status.

Functions

In order for the load shed functions to work properly, a number of processes have to take place ahead of its actual function, for example:

Load Shed Learning:

The ATS needs to have stored in its memory what current drain value each high current load imposes on the system, the power capacity of the generator and the priority of each load.

This information is acquired (supplied to the ATS control module) during a process called 'Load Shed Learning', and this process is preferably executed at the time of installation or when a new load is installed on the system.

The prerequisites for load shed learning are as follows:

All branch circuit breakers in the transfer switch must be turned to their respective "off" positions, to ensure the accuracy of current measurements recorded during the "learning" procedure.

1. One branch circuit is provided for installer service lighting to be located physically near the ATS installation site, to be provided power during the installation and learning procedure. This nominal load will actually be measured during the Load Shed Learning test.
2. To ensure that all loads under test will come on when their respective circuit breakers are activated, the installer should set the controls for each load to their respective maximum settings. In other words, the controls for these load shed loads should be set for them to draw full load, e.g., air conditioners should be set for maximum cooling, electric water heater to maximum heating, and so on.
3. The ATS control panel preferably will have a rotary switch or switches (e.g., switch(es) 202 in FIG. 28) that is designated 'Generator Size', which must be set for the correct generator capacity. This switch may have restricted access, e.g., through a hole in the top of the control module, and the rotary switch may be configured to be divided into any suitable increments, depending upon the intended size range of the particular ATS.

The following steps, and button actuations (referencing the user interface of FIG. 28) represent an exemplary preferred embodiment of the invention, and the steps may be modified (e.g., by changing selection of the particular "button" or sequence of buttons to be actuated to represent a particular programming instruction) without departing from the scope of the invention.

The 'Load Shed Learning' mode may entered, e.g., by first holding down Service button 206 then pressing Reset button 209 (FIG. 28). This will initiate a pseudo generator transfer cycle with the following sequence to be followed. All Load Shed circuits will be caused to open or close their respective relays or breakers (depending on whether they are normally closed or normally open) so that the initial state is one in which none of the Load Shed circuits are receiving any power. In addition, in order to ensure that reliable power consumption readings for the Load Shed circuits are obtained, all circuits in the overall system that are designated as "base" or "mandatory" circuits must be turned off or disconnected.

1. The generator starts, runs up to speed—the control module measures the steady-state output voltage and frequency of the generator. Once the control module will then determine whether a valid stable output is attained by the generator. In systems in which another type of alternative auxiliary power source is provided (e.g., solar power, stored battery power, etc.,), that power source is brought to a "ready" state in which it can supply reliable power if called upon to do so. Once a valid power signal (or valid "read" state) has been found by the control module, the control module will initiate operation of the transfer mechanism, to switch from utility power to the auxiliary power source.

2. The control module will interrogate the load shed circuitry to see how many Load Shed (aka "Load Management") Modules are installed on the control module PCB and in what positions they are located on the PCB. This information will be placed in memory and used during the Load Shed Learning Cycle.

3. The Control Module then looks for a current<2 amps on the generator output (as mentioned, all branch circuit breakers at this time should be in their respective "OFF" positions, except for the branch circuit for the installer service lighting). This latter value will be stored in temporary memory storage as 'service current'. Zero amps would also be considered valid in the case where no service current is used.

4. If 'service current' is present and at least one load management module is installed on the PCB, the control module is preferably set up to flash all LEDS simultaneously for a predetermined period (e.g., 10 seconds), serving as an indicator to the installer that, absent immediate action by the installer, the control module will proceed immediately into "Automatic" Load Shed Learning Mode.

5. The control module will then cause LSM1 to enable power to be supplied to its first (of two available) assigned circuits, simultaneously illuminating LED #1 (ref. 211) if desired. The control circuitry is programmed to "watch" the draw by the first Load Shed circuit for a predetermined time, e.g., 5 seconds, to see if the draw exceeds the permissible draw for any single Load Shed circuit, namely a preselected percentage (e.g., 85%) of the total available auxiliary power source output.

6. If the operation of the first Load Shed circuit passes through the initial five second period without incident, and the sensed current is above the nominal "service current" value, then the control module circuitry will monitor the operation of that circuit for a further extended period of time, e.g., 20 seconds, during which the peak power draw will be noted. At the end of that 20 second time period, whatever the instantaneous maximum current draw was observed, that value is stored in memory as been associated with the first Load Shed circuit. The display for LED #1 (ref. 211) may shift from a flashing display to a continuous display, as a visual indication to the observing installer. Once the peak current draw value has been stored in memory, then the control circuitry causes LSM1 to cut of power to the circuit being tested, and turns off LED #1 (211).

7. The control module then causes power to be supplied to the other of the two circuits controlled by LSM #1, and follows the foregoing steps for that circuit, in addition causing LED #2 to be illuminated, in turns, in either flashing or steady illumination.

8. Each designated "Load Shed" load is measured in turn following the same sequence. As mentioned, in a preferred embodiment of the invention, each load management module may address 2 loads, and in the present invention, up to 3 load management modules are contemplated (though a greater number of load management modules may be incorporated into the design without departing from the scope of the invention). The test will be terminated once all of the available loads in the load management modules have been queried and recorded. Some loads, such as AC, may actually require the use of two circuit breakers, and accordingly, such a single load may actually occupy both circuits of a single load service module.

9. Because (in the illustrated embodiment) there are only 5 LEDS, load shed load 6 will use LED #1 and #5 together (refs. 211 and 217) as indicators.

10. If, during the test of any one of the Load Shed circuits, only the "service current" load is sensed (during the 20 second "measuring period), then the control module programming will identify that circuit as having a potential trouble issue, and will cause the LED display to be illuminated in a manner that has been pre-established to signify than a potential trouble item has been encountered. The current value will be stored.

11. If, on the other hand, the control module encounters, during the initial five-second period, a current draw which is in excess of the allowed current draw (e.g., >85% of rated auxiliary power source), then the actual value is not stored in memory. Instead, a value of "zero" (0) is stored in memory, which identifies that circuit to the control module programming as being a disqualified circuit which, during emergency power operations, is never to be supplied with current. During load shed learning, if this load is presented to the generator it will start going into overload. The control module at that time will see a marked drop in voltage and frequency. The circuit is immediately shut off, without going through the 20 second "measuring period". A rapid flashing of the corresponding LED may be caused, to indicate to the installer that a disqualifying load has been encountered during the test. If a larger generator or a smaller load is subsequently installed, a new load shed learning cycle may change this disqualification.

12. In the event that fewer than six loads are to be queued for load shed learning, the load shed learning cycle can be terminated by pressing the service switch after the last load has been learned.

13. If an event occurs such as described in step 10, in which a trouble load is reported, then the installer or consumer must inspect whatever devices or appliances are involved for that circuit to determine the problem (e.g., burned out bulb or motor). Once the problem has been addressed, then the learning step for that circuit must be repeated. In accordance with the present invention, instead of having to run through the entire automatic cycle, a manual learning step may be ordered. The installer begins at step 1, and proceeds through to step 4 (the "all-LEDS flashing" period of ten seconds). Before the end of that ten-second period, the installer (or consumer) presses e.g., the "START/STOP" button, to go into manual mode.

14. The installer then presses "TRANSFER" until the LED corresponding to the circuit which had previously reported trouble is illuminated. The installer then presses "EXERCISE" and manually actuates the relay associated with that circuit to turn on the load. The control module then monitors the load for the initial five-second period, and if valid and above the service current threshold, and the value is stored. The installer/consumer then presses "RESET" to exit manual mode.

15. The control module may also, if desired, be provided with suitable programming (using known programming techniques) to permit so-called "quick and dirty" load shed learning. An installer, using a manual current sensing device (an "amp clamp"), may personally and individually take current draw readings for each of the load shed circuits and then, using a preselected set of button strokes on the user interface, can input the numerical values for the respective circuits, using a modified binary code.

The Load Shed Function

The load shed function applies only to those non-base, non-mandatory loads, which are potentially and optionally eligible to receive power during emergency operations, that are connected to and managed by load management modules. There may be certain loads in a system, which are mandatory. Examples of "mandatory loads" may include (depending upon the preferences of the consumer): refrigerators and freezers; aquariums; central heating systems; furnace fans/air handlers; sump pumps; septic lift pumps; pool and spa antifreeze pumps; medical, safety and security equipment; garage door openers; access gates; selected lighting systems; and computers, printers, fax machines, land-line phones and wireless routers. These loads, if deemed to be necessary during emergency power situations (and presuming adequate auxiliary power capacity) will be permanently connected to the output of the transfer switch, and, assuming that their total draws do not exceed the capacity of the auxiliary power source, will receive power during emergency operations, so long as the auxiliary power source is capable of meeting their demands. Such mandatory loads, for purposes of this invention, will be defined collectively as the "Base Load". Any additional loads (the "load shed" loads) will be met, as a function of the availability of excess power permits. Such discretionary "emergency power" loads may include items such as: cooking equipment; water heating equipment for human consumption; clothes cleaning equipment; spa, exercise and entertainment equipment (some of the latter might be included in the "mandatory" list). While the foregoing categorizations are recommended, of course the ultimate decision as to what load goes into the mandatory category and what load goes into the discretionary "load shed" category, and what load is determined to be entirely unpowered during emergency power operations, lies with the home owner or installer.

In the event of a power failure, the loss of voltage on the main utility circuit breaker will be sensed by the control module. A timing sequence will be initiated to see if the auto-restart of the power grid will successfully restore the power. If this is unsuccessful a transfer sequence will be initiated by the Control Module. Again, any numerical values provided hereinbelow are by way of example, and other systems may employ other preselected numerical values for specific parameters without departing from the scope of the present invention.

1. A signal to start the generator is initiated by energizing the crank and run relays.
2. After the generator starts the control module will start reading the presence of voltage and frequency.
3. If the generator voltage and frequency is acceptable, power transfer to the generator is initiated whereby the motor propelling the interlock actuator will start driving the actuator mechanism to turn off the utility circuit breaker followed by turning on the generator circuit breaker.
4. During the power transfer to the generator cycle, the control module will also energize (move to "OFF") all of the load shed relays installed on the system. This will ensure that only the non-load shed loads (the "base loads") will be powered by the generator at this time.
5. The control module will initiate a 5 minute delay cycle before trying to activate any load shed loads. This is to allow residual head pressure in air conditioner compressors to bleed off before trying to start the unit, to lower the torque requirements for resumption of operation under emergency power.
6. Based on the value set in the generator size switch, the control module will calculate the load current relative to the generator size.
7. From the pre-stored values gathered during the Load Shed Learning cycle, the control module will look at all of the stored values of Load Shed loads weighted by priority.
8. If the value of the Priority 1 load plus the load already present on the system does not exceed e.g., 85% of the generator capacity, the Priority 1 load shed relay will de-energize (move to "ON") enabling the load to function.
9. The system will continue to sequence through the stored Load Shed values on a priority basis continually tallying these values against the load already present on the generator.
10. In a preferred embodiment of the invention, the system is always trying to apply the load shed loads to the system that, in total, will not exceed 85% of the generator capacity.
11. Formula: Base Load(s)+(Load Shed Load 1+Load Shed Load 2+etc)=<85% Generator capacity
12. Due to the fact that most Load Shed loads are not constant (e.g., an air conditioner, heat pump, water heater, etc.), the control module will allow additional loads to function during the low power periods of these loads. For example, if the Priority 1 load+the base load does not allow for any additional loads when the Priority 1 load is at full power the system will continuously monitor the total load on the generator for any change in the total load current. When the value of the total load drops to a value whereby additional loads will not cause the total load to exceed 85%, the system will bring these loads on line on a priority basis.
13. It is possible for lower priority loads to function if the higher priority loads+the base load exceed 85% capacity, as the control module and load management modules may not allow the combination of base load and higher priority loads, but will allow a combination of base load and lower priority (and possible lower numerical value) loads to go online.
14. If the unlikely event that at any time during auxiliary power operation, a situation arises in which the total demand from the base load alone exceeds the aforementioned preselected percentage (e.g., 85%) of generator power, and/or the combination of base load demand and any potential load shed load exceeds the preselected percentage, then load shed operation is not possible, the ATS may be programmed, as a default operation to prevent overload and damage to the auxiliary power source, to transfer back to connection to utility power. The control module may be suitably programmed to thereafter periodically check the total demands requested by base and load shed loads and if load shed operations become possible, a transfer back to auxiliary power operations may be provided for.
15. Once utility power is restored, and all re-transfer parameters are met, the control module will cause the motor driving the interlock actuator to run in the opposite direction, causing the generator breaker to disengage, followed by the engaging of the utility breaker.

16. The generator enters a 5 minute cool down cycle and all the installed load shed relays will de-energize allowing all the Load Shed loads to function on utility power.

Figure 32:
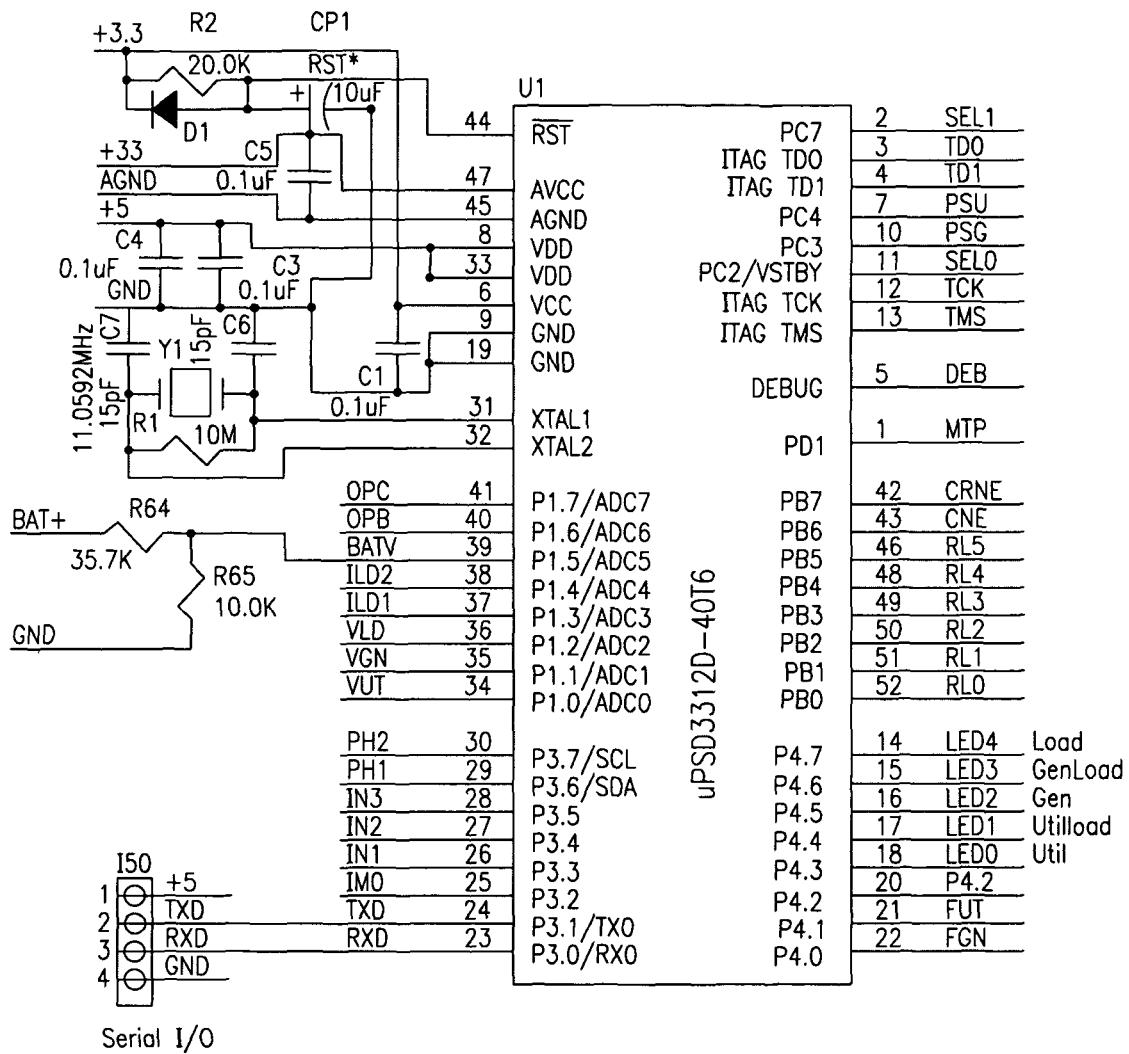
Figure 33:
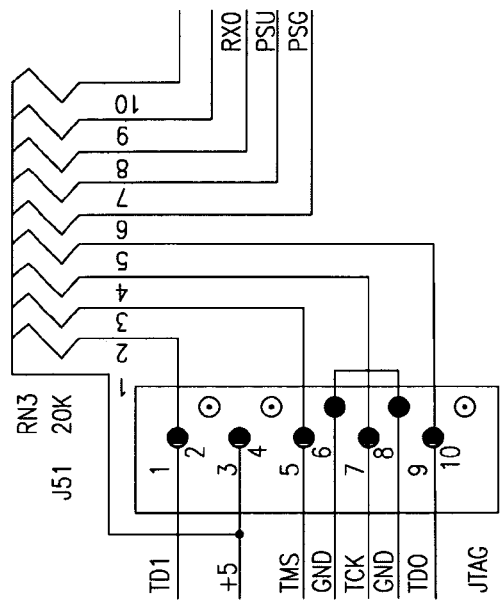
Figure 33:
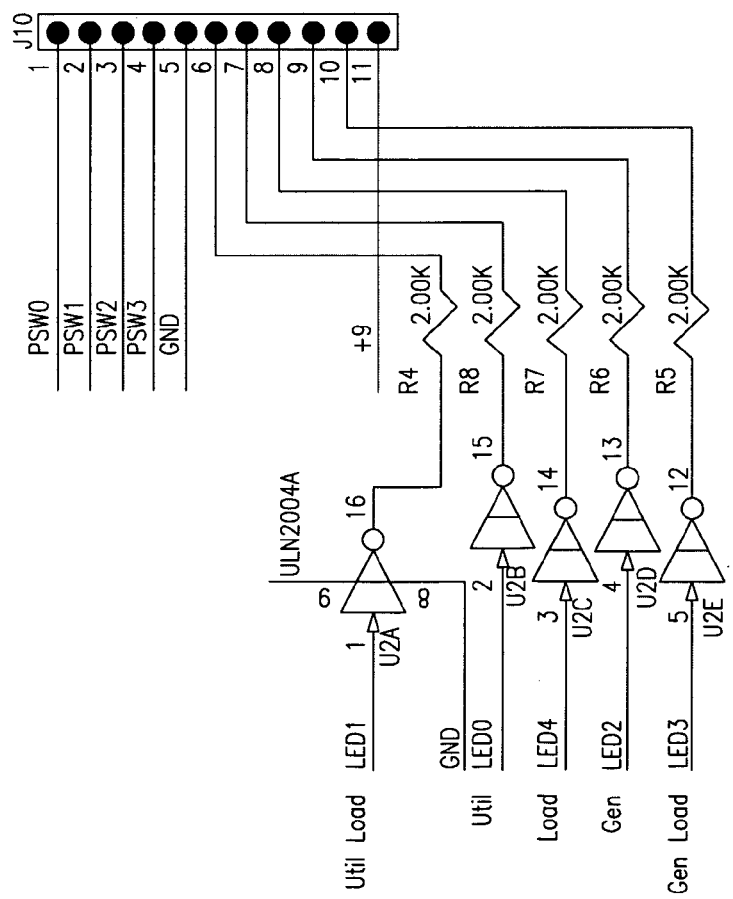
Figure 34:
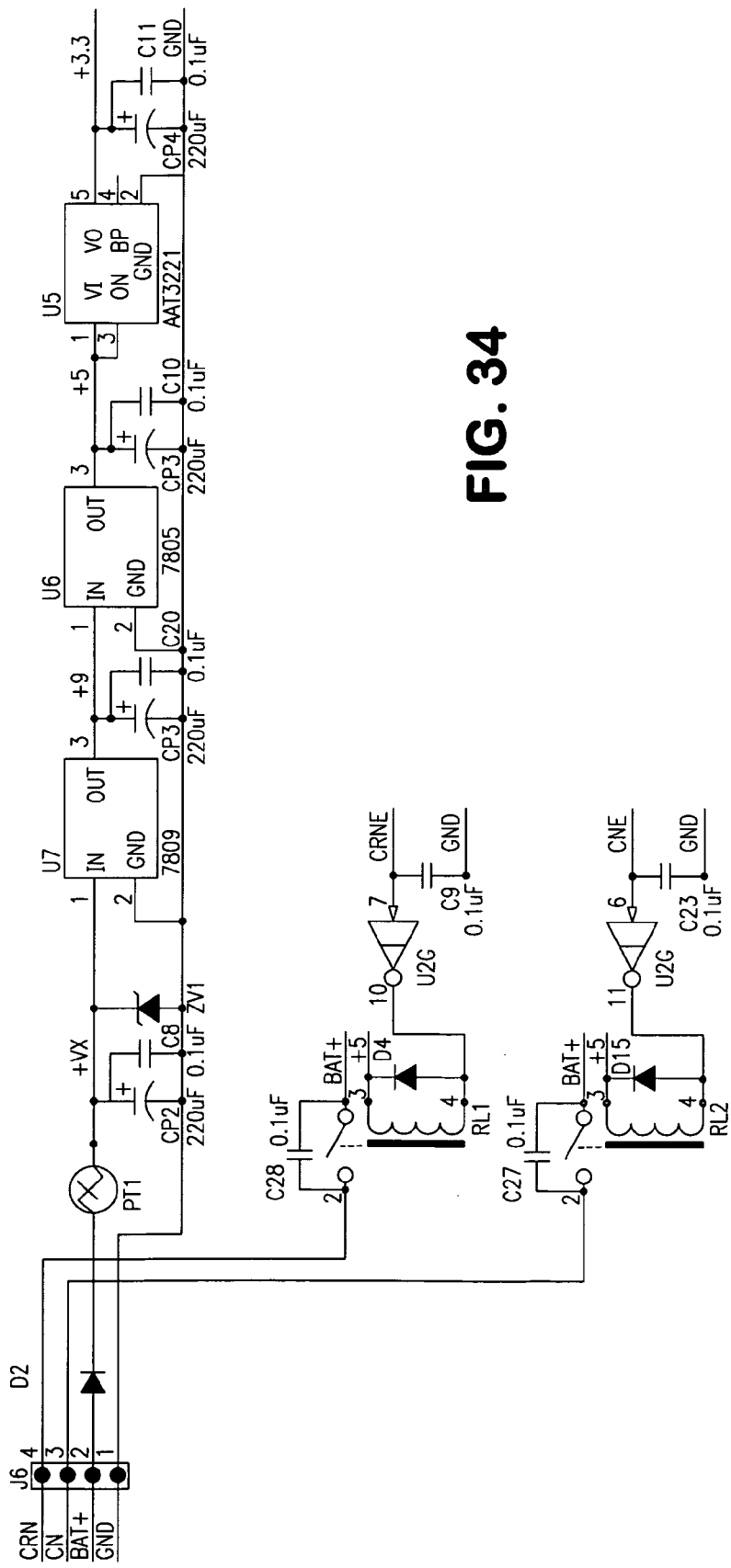
Figure 35:
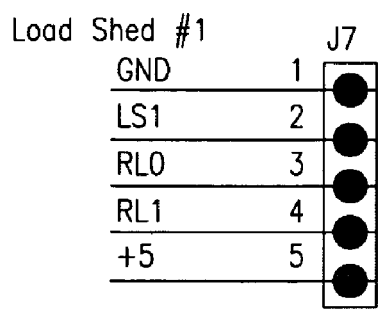
Figure 35:
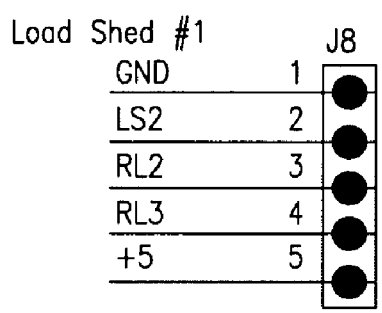
Figure 35:
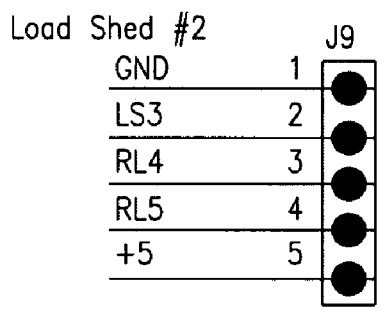
Figure 36:
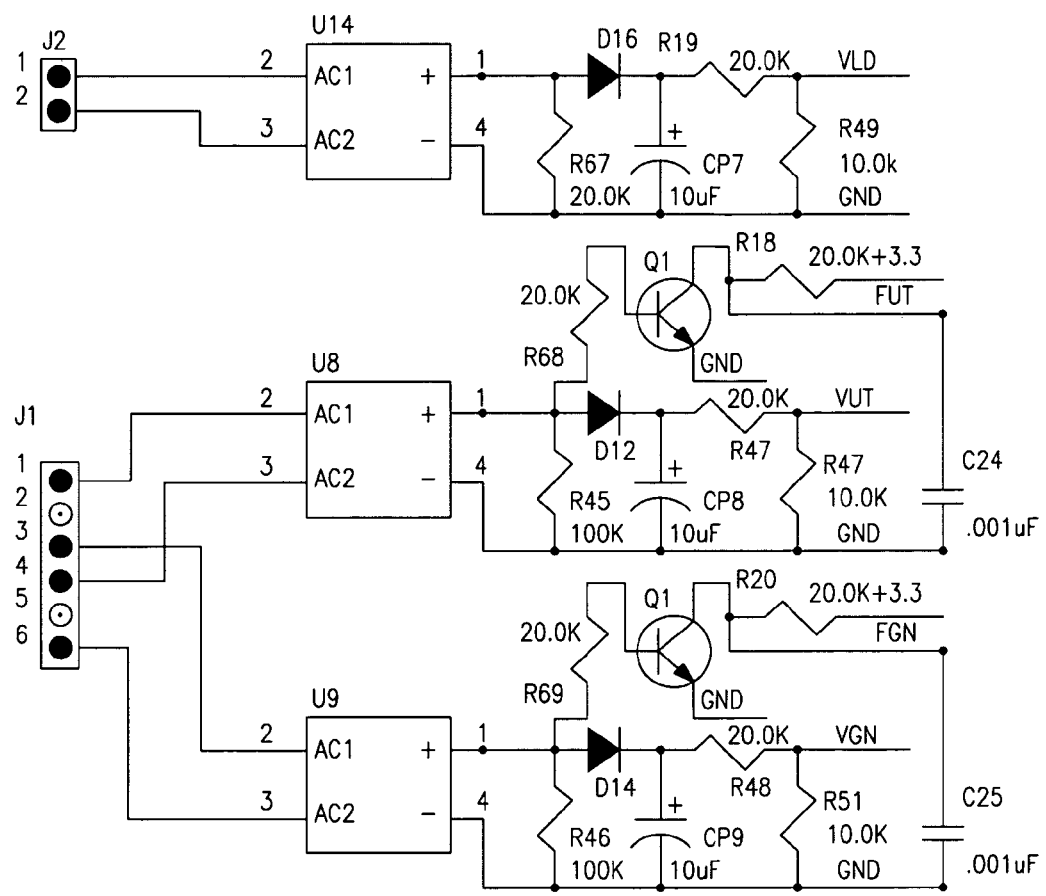
Figure 37:
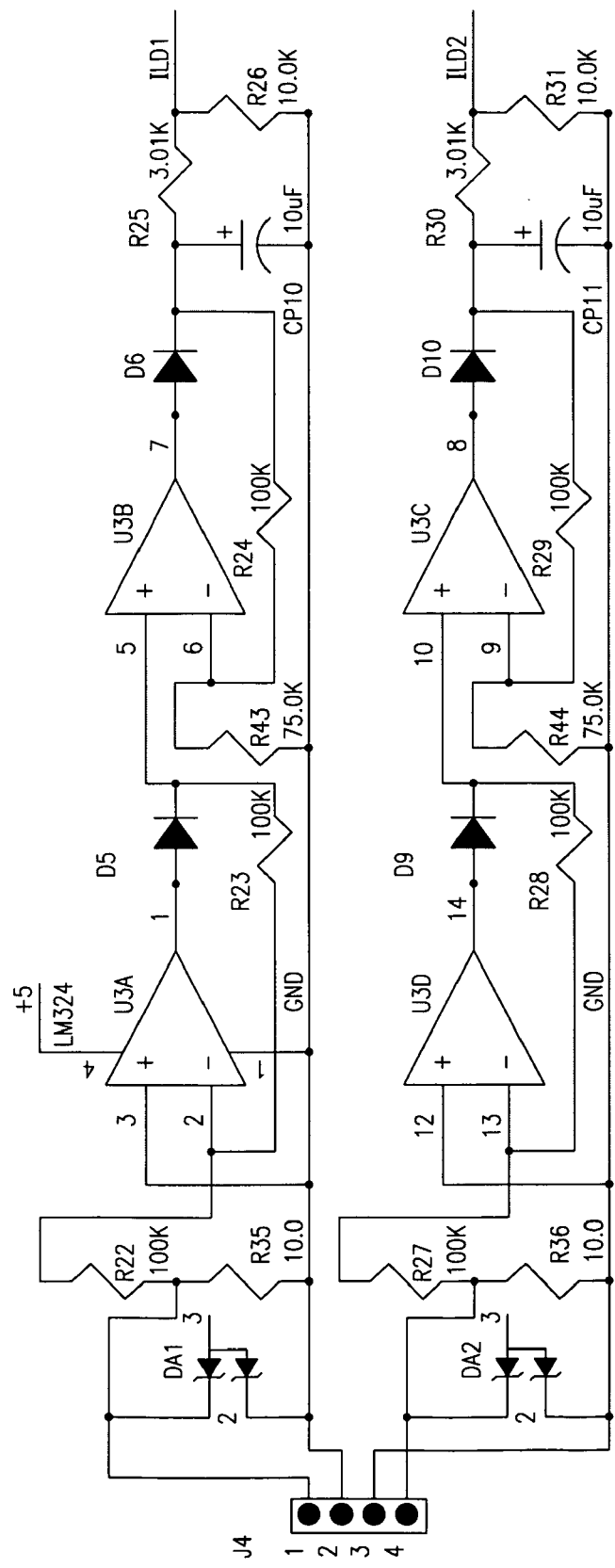
Figure 38:
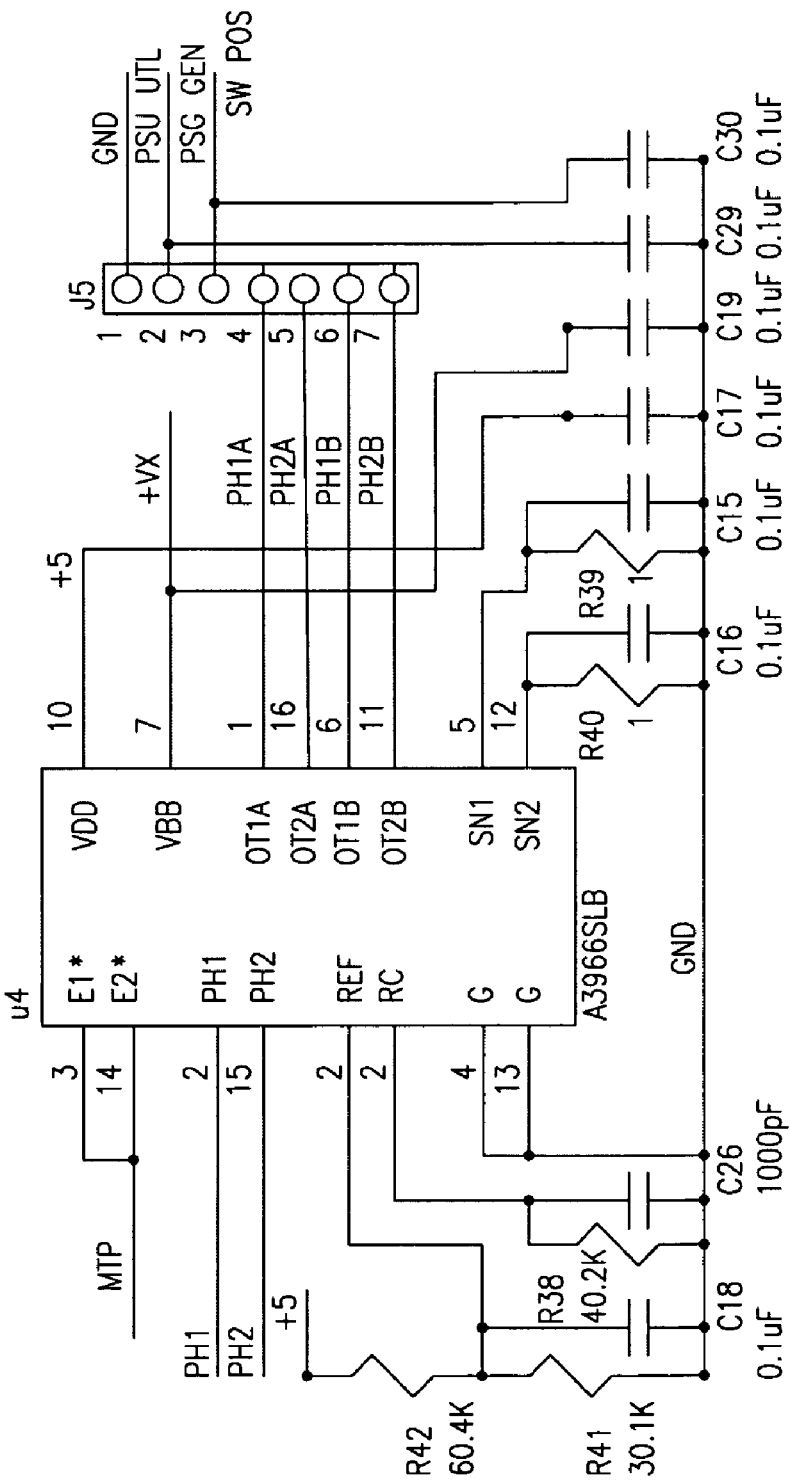
Figure 39:
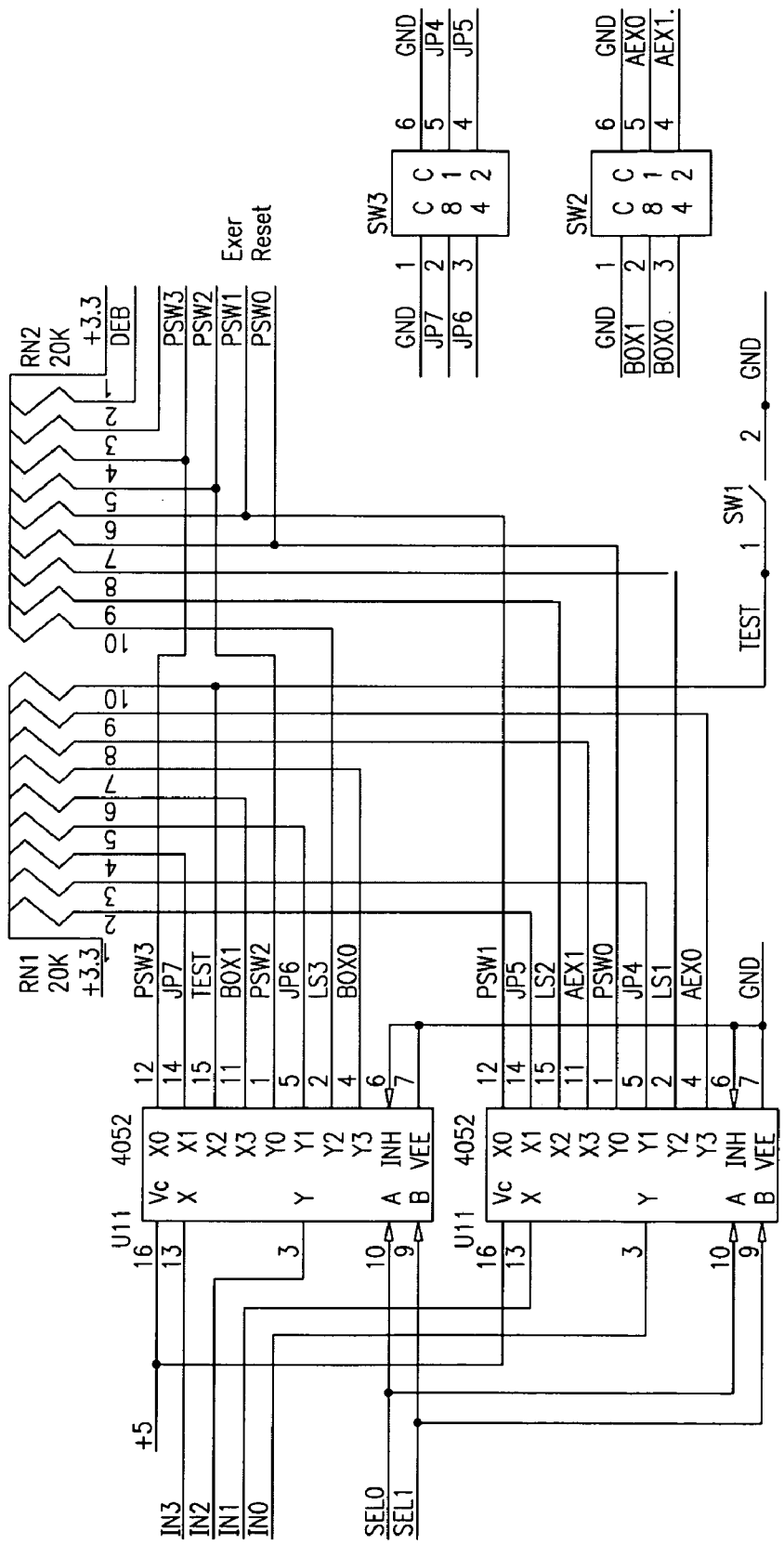

FIGS. 32-39 illustrate the schematics for representative circuits comprising the control module for an ATS according to an embodiment of the present invention. In particular, FIG. 32 shows the microprocessor and clock circuits which control the functions of the module. FIG. 33 shows the display LED drive circuits and JTAG programming port used for inputting software into the microprocessor. FIG. 34 shows representative voltage regulation circuitry and 12 v outputs for generator start crank signals (crank and run control). FIG. 35 is a schematic for the load shed control outputs. The load shed modules (see, e.g., FIG. 40) plug into the control module circuit here. FIG. 36 shows the voltage and frequency monitoring circuits for the utility and generator power sources. FIG. 37 is the current monitoring circuit for the auxiliary generator power output. FIG. 38 is the drive circuit for the motor (e.g., a stepper motor) for driving the transfer interlock mechanism for flipping the breakers in the transfer switch function. FIG. 39 is a schematic for multiplexor circuits used to control signals to and from the microprocessor of FIG. 32—the user interface switches, load shed presence, generator size, ATS model information, etc. FIG. 40 is a schematic of a representative circuit for a load shed model according to a preferred embodiment of the invention. FIGS. 41A, 41B illustrate a block diagram for the control module and user interface for an Automatic Transfer Switch according to an embodiment of the present invention, showing the connections to utility power and to an auxiliary electrical generator.

The foregoing description and drawings merely explain and illustrate the invention, and the invention is not so limited as those skilled in the art who have the disclosure before them will be able to make modifications and variations therein without departing from the scope of the invention.

What is claimed is:

1. An interlock mechanism for use in an automatic transfer switch having first and second breakers switches with corresponding first and second breaker switch handles, comprising:

an interlock member movably mounted adjacent to the first and second breaker switches, in cooperating arrangement with the first and second breaker switch handles, for preventing both first and second breaker switch handles from being in their respective ON positions simultaneously, so that upon movement of one of the first and second breaker switch handles to its ON position, causes the one of the first and second breaker switch handles contacts the interlock member, and causes it to move, and bear against the other of the first and second breaker switch handles to move the other of the first and second breaker switch handles to its OFF position; and an actuator, moveably mounted adjacent to the first and second breaker switches, in driven connection to a prime mover, and in cooperating arrangement with the first and second breaker switch handles, for selectively pushing one of the first and second breaker switch handles away from its OFF position, toward its ON position, so that the breaker switch handles are operably interposed between the interlock member and the actuator, the interlock member and the actuator being cooperatively configured to enable both of the first and second breaker switch handles to be in their respective OFF positions, but to preclude both of the first and second breaker switch handles from being in their respective ON positions simultaneously, the interlock member and the actuator being further cooperatively configured so as to ensure that when the actuator is being driven to move a breaker switch handle for one of the first and second breakers from its OFF position to its ON position, the breaker switch handle for the other of the first and second breakers will be moved by the interlock member from its ON position to its OFF position, before the breaker switch handle of the one of the first and second breakers attains its ON position.

2. The interlock mechanism according to claim 1, wherein:

the first and second breaker switches are mounted in tandem, with the first and second breaker switch handles being disposed for rotation around axes that are in parallel, spaced apart relation to one another, so that when each breaker switch handle is in its respective "OFF" position, the breaker switch handles are pivoted toward one another and when each breaker switch handle is in its respective "ON" position, the breaker switch handles are pivoted away from one another;

the interlock member is movably mounted for reciprocating movement between and against the breaker switch handles, along an axis extending transverse to the rotational axes of the first and second breaker switch handles; and the actuator is disposed in straddling relationship to the first and second breaker switch handles, for reciprocating movement at least in part parallel to the transversely extending axis of movement of the interlock member.

3. The interlock mechanism according to claim 2, wherein:

the actuator is further configured to undergo pivoting movement about a second axis extending perpendicular to the rotational axes of the first and second breaker switch handles.

4. The interlock mechanism according to claim 1, wherein:

the first and second breaker switches are disposed in side-by-side relationship, with their respective first and second breaker switch handles being disposed for rotation about axes extending parallel to one another;

the interlock member is disposed for reciprocating pivoting movement about a first axis extending transversely to the axes of rotation of the first and second breaker switch handles; and the actuator is disposed for reciprocating pivoting movement about a second axis extending parallel to the first transverse axis of pivoting movement of the actuator.

5. The interlock mechanism according to claim 4, wherein:

the actuator further includes an arm operably configured to push against the interlock member, when the actuator is being pivoted in a first direction around its axis of rotation.

6. The interlock mechanism according to claim 4 wherein:

the interlock member is further operably configured to undergo transverse sliding movement relative to its pivot axis.

7. The interlock mechanism according to claim 4, wherein each of the actuator and the interlock member have a first contact end for contacting one of the first and second breaker switch handles and a second contact end for contacting the other of the first and second breaker switch handles.

8. The interlock mechanism according to claim 7, wherein at least one of the first and second contact ends of at least one of the actuator and interlock member is provided with a rolling member, for reducing sliding friction between the at least one of the first and second contact ends and its corresponding breaker switch handle.

9. An automatic transfer switch, comprising:

a first breaker switch operably and interruptably connected between a load and a utility power source, the first breaker switch having a first breaker switch handle movable between ON and OFF positions;

a second breaker switch operably and interruptably connected between the load and an auxiliary power source, the second breaker switch having a second breaker switch handle movable between ON and OFF positions;

an interlock mechanism, operably interconnecting the first and second breaker switch handles, for selectably moving the one of the first and second breaker switch 10 handles away from one of its ON or OFF positions to the other of its ON or OFF positions, while also moving the other of the first and second breaker switch handles away from its OFF or ON positions to the other of its OFF or ON positions, respectively;

a motor assembly, drivingly connected to the interlock mechanism; and a controller, operably connected to the first and second breakers, the utility power supply, the auxiliary power supply, and the motor assembly, for actuating the interlock mechanism so as to cause the first and second breaker switch handles to change positions, upon detection by the controller of a change in at least one characteristic of utility power being supplied which corresponds to a predetermined condition indicating a possible impending loss of utility power;

the interlock mechanism including an interlock member movably mounted adjacent to the first and second breaker switches, in cooperating arrangement with the first and second breaker switch handles, for preventing both first and second breaker switch handles from being in their respective ON positions simultaneously, so that upon movement of one of the first and second breaker switch handles to its ON position, causes the one of the first and second breaker switch handles contacts the interlock member, and causes it to move, and bear against the other of the first and second breaker switch handles to move the other of the first and second breaker switch handles to its OFF position; and an actuator, moveably mounted adjacent to the first and second breaker switches, in driven connection to the motor assembly and in cooperating arrangement with the first and second breaker switch handles, for selectively pushing one of the first and second breaker switch handles away from its OFF position, toward its ON position, so that the breaker switch handles are operably interposed between the interlock member and the actuator.

* * * * *